(12) United States Patent
Koniaris

(10) Patent No.: US 12,049,241 B2
(45) Date of Patent: *Jul. 30, 2024

(54) METHODS AND SYSTEMS FOR MANAGING ACCESS TO SEATS AND STORAGE IN AUTONOMOUS VEHICLES

(71) Applicant: Argo AI, LLC, Pittsburgh, PA (US)

(72) Inventor: Kleanthes George Koniaris, San Francisco, CA (US)

(73) Assignee: Argo AI, LLC, Pittsburgh, PA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/201,277

(22) Filed: May 24, 2023

(65) Prior Publication Data

US 2023/0294740 A1    Sep. 21, 2023

Related U.S. Application Data

(63) Continuation of application No. 17/308,601, filed on May 5, 2021, now Pat. No. 11,697,434.

(51) Int. Cl.
| | |
|---|---|
| *B60W 60/00* | (2020.01) |
| *B60R 25/24* | (2013.01) |
| *G05D 1/00* | (2024.01) |
| *H04L 67/12* | (2022.01) |

(52) U.S. Cl.
CPC ....... *B60W 60/00256* (2020.02); *B60R 25/24* (2013.01); *G05D 1/0212* (2013.01); *H04L 67/12* (2013.01)

(58) Field of Classification Search
CPC ............. B60W 60/00256; H04L 67/12; G05D 1/0212; B60R 25/24

USPC ........................................................ 701/25
See application file for complete search history.

(56) References Cited

U.S. PATENT DOCUMENTS

| | | | |
|---|---|---|---|
| 8,989,053 B1 * | 3/2015 | Skaaksrud | H04L 67/52 |
| | | | 370/255 |
| 10,106,206 B1 | 10/2018 | Baccouche et al. | |
| 10,303,171 B1 | 5/2019 | Brady et al. | |
| 2014/0180914 A1 * | 6/2014 | Abhyanker | G06Q 10/0832 |
| | | | 705/332 |
| 2017/0139413 A1 * | 5/2017 | James | G06Q 10/08 |
| 2019/0362295 A1 | 11/2019 | Kanitz | |

(Continued)

*Primary Examiner* — Yazan A Soofi
(74) *Attorney, Agent, or Firm* — The Webb Law Firm

(57) ABSTRACT

Systems for managing access to an autonomous vehicle includes an autonomous vehicle including a plurality of storage compartments, wherein each of the plurality of storage compartments comprises a locking mechanism and at least one processor to receive data associated with an item to be positioned in a storage compartment of the plurality of storage compartments, determine that one of the plurality of storage compartments has storage capacity for the item, designate one of the plurality of storage compartments for storage of the item, activate the locking mechanism of the designated storage compartment to lock the designated storage compartment after the item is positioned in the designated storage compartment, and activate the locking mechanism of the designated storage compartment to unlock the designated storage compartment to allow removal of the item from the designated storage compartment. Methods, computer program products, and autonomous vehicles are also disclosed.

20 Claims, 15 Drawing Sheets

(56) References Cited

U.S. PATENT DOCUMENTS

2019/0392370 A1* 12/2019 Kashi .................... G07F 17/244
2021/0012125 A1* 1/2021 Schmidt .................. H04W 4/40
2021/0304559 A1* 9/2021 Cupersmith ............. H04N 7/15

* cited by examiner

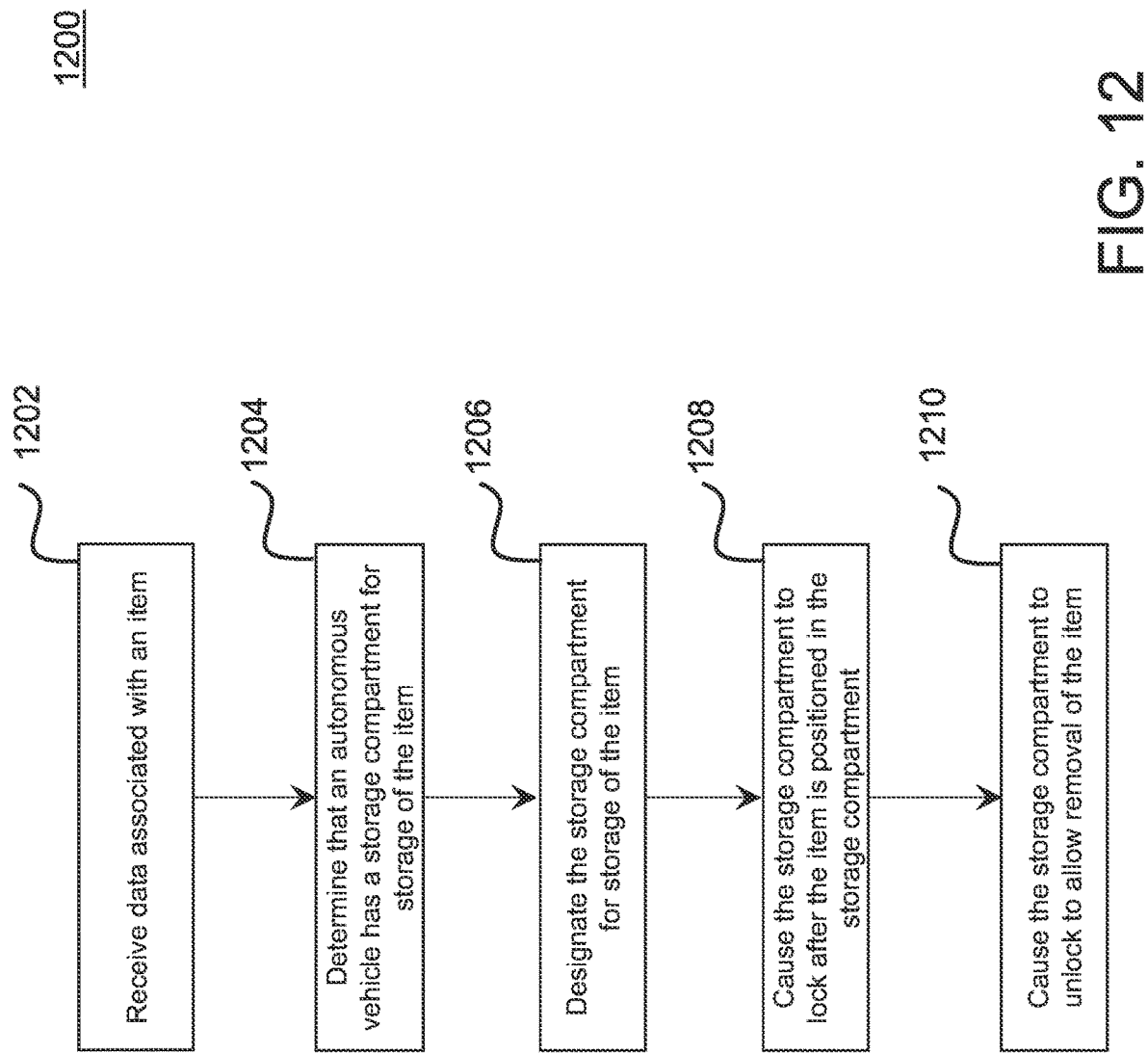

METHODS AND SYSTEMS FOR MANAGING ACCESS TO SEATS AND STORAGE IN AUTONOMOUS VEHICLES

CROSS REFERENCE TO RELATED APPLICATION

This application is a continuation application of U.S. patent application Ser. No. 17/308,601, filed May 5, 2021, the disclosure of which is incorporated herein by reference in its entirety.

BACKGROUND

1. Field

This disclosure relates generally to managing aspects of autonomous vehicles and, in some non-limiting embodiments, to managing access to seats and storage compartments in autonomous vehicles.

2. Technical Considerations

An autonomous vehicle (e.g., a driverless car, a driverless auto, a self-driving car, a robotic car, etc.) is a vehicle that is capable of sensing an environment of the vehicle and traveling (e.g., navigating, moving, etc.) in the environment without manual input from an individual. An autonomous vehicle uses a variety of techniques to detect the environment of the autonomous vehicle, such as radar, laser light, Global Positioning System (GPS), odometry, and/or computer vision. In some instances, an autonomous vehicle uses a control system to interpret information received from one or more sensors, to identify a route for traveling, to identify an obstacle in a route, and to identify relevant traffic signs associated with a route.

A ridesharing service may include a service (e.g., a ride-hailing service) provided by an entity (e.g., a company, such as a transportation network company) that matches a potential passenger with a driver of a vehicle for hire that may not otherwise be hailed by the potential passenger from an on-site location (e.g., a location on a street). In some instances, the ridesharing service may be operated via a mobile application on a mobile device where a user may set up a personal profile with a name, phone number, payment preference (e.g., a credit card, e-commerce payment system, cash, etc.), or other information. After the ridesharing service provided to the user is complete, the user may be given an option to provide a comment about and/or a gratuity to the driver of the vehicle in which the user was a passenger.

SUMMARY

Provided are systems, methods, products, apparatuses, and/or devices for managing access to seats and storage in autonomous vehicles.

According to some non-limiting embodiments, provided is a system comprising an autonomous vehicle, comprising: a plurality of storage compartments, wherein each of the plurality of storage compartments comprises a locking mechanism configured to lock and unlock the plurality of storage compartments and at least one processor programmed or configured to: receive data associated with an item to be positioned in a storage compartment of the plurality of storage compartments; determine that one or more storage compartments of the plurality of storage compartments has storage capacity for the item; designate a storage compartment of the plurality of storage compartments for storage of the item as a designated storage compartment; activate the locking mechanism of the designated storage compartment to lock the designated storage compartment after the item is positioned in the designated storage compartment; and activate the locking mechanism of the designated storage compartment to unlock the designated storage compartment to allow removal of the item from the designated storage compartment.

According to some non-limiting embodiments, provided is a method comprising: receiving, by at least one processor, data associated with an item to be positioned in a storage compartment of a plurality of storage compartments of an autonomous vehicle; determining, by the at least one processor, that one or more storage compartments of the plurality of storage compartments has storage capacity for the item; designating, by the at least one processor, a storage compartment of the plurality of storage compartments for storage of the item as a designated storage compartment; activating, by the at least one processor, a locking mechanism of the designated storage compartment to lock the designated storage compartment after the item is positioned in the designated storage compartment; and activating, by the at least one processor, the locking mechanism of the designated storage compartment to unlock the designated storage compartment to allow removal of the item from the designated storage compartment.

According to some non-limiting embodiments, provided is an autonomous vehicle comprising a plurality of storage compartments, wherein each of the plurality of storage compartments comprises a locking mechanism configured to lock and unlock the plurality of storage compartments; and at least one processor programmed or configured to: receive data associated with an item to be positioned in a storage compartment of the plurality of storage compartments; determine that one or more storage compartments of the plurality of storage compartments has storage capacity for the item; designate a storage compartment of the plurality of storage compartments for storage of the item as a designated storage compartment; activate the locking mechanism of the designated storage compartment to lock the designated storage compartment after the item is positioned in the designated storage compartment; and activate the locking mechanism of the designated storage compartment to unlock the designated storage compartment to allow removal of the item from the designated storage compartment.

Further embodiments are set forth in the following numbered clauses:

Clause 1: a system comprising: an autonomous vehicle, comprising: a plurality of storage compartments, wherein each of the plurality of storage compartments comprises a locking mechanism configured to lock and unlock the plurality of storage compartments; and at least one processor programmed or configured to: receive data associated with an item to be positioned in a storage compartment of the plurality of storage compartments; determine that one or more storage compartments of the plurality of storage compartments has storage capacity for the item; designate a storage compartment of the plurality of storage compartments for storage of the item as a designated storage compartment; activate the locking mechanism of the designated storage compartment to lock the designated storage compartment after the item is positioned in the designated storage compartment; and activate the locking mechanism of the designated storage compartment to unlock the designated storage compartment to allow removal of the item from the designated storage compartment.

Clause 2: The system of clause 1, wherein the at least one processor is further programmed or configured to: receive an indication of a condition associated with the designated storage compartment of the autonomous vehicle from a user device of a user.

Clause 3: The system of clauses 1 or 2, wherein the at least one processor is further programmed or configured to: determine whether the item has been removed from the designated storage compartment of the autonomous vehicle.

Clause 4: The system of any of clauses 1-3, wherein, when designating the storage compartment of the plurality of storage compartments for storage of the item as the designated storage compartment, the at least one processor is programmed or configured to: designate the storage compartment of the plurality of storage compartments for storage of the item as the designated storage compartment based on determining that the storage compartment has storage capacity for the item.

Clause 5: The system of any of clauses 1-4, wherein the at least one processor is further programmed or configured to: provide an indication of a position of the designated storage compartment of the autonomous vehicle to a user device.

Clause 6: The system of any of clauses 1-5, wherein, when determining that the one or more storage compartments of the plurality of storage compartments has storage capacity for the item, the at least one processor is programmed or configured to: compare the data associated with the item to data associated with the one or more storage compartments of the autonomous vehicle; and determine that the data associated with the item corresponds to the data associated with the one or more storage compartments of the autonomous vehicle.

Clause 7: The system of any of clauses 1-6, wherein the at least one processor is further programmed or configured to: transmit a notification to a user device based on determining that the item has not been removed from the designated storage compartment of the autonomous vehicle.

Clause 8: The system of any of clauses 1-7, wherein the at least one processor is further programmed or configured to: determine that the item has been positioned in the designated storage compartment of the autonomous vehicle; and cause the autonomous vehicle to travel on a route to a destination location based on determining that the item has been positioned in the designated storage compartment of the autonomous vehicle.

Clause 9: The system of any of clauses 1-8, wherein the at least one processor is further programmed or configured to: determine that the autonomous vehicle has arrived at the destination location; and determine whether the item has been removed from the designated storage compartment of the autonomous vehicle based on determining that the autonomous vehicle has arrived at the destination location.

Clause 10: A method comprising: receiving, by at least one processor, data associated with an item to be positioned in a storage compartment of a plurality of storage compartments of an autonomous vehicle; determining, by the at least one processor, that one or more storage compartments of the plurality of storage compartments has storage capacity for the item; designating, by the at least one processor, a storage compartment of the plurality of storage compartments for storage of the item as a designated storage compartment; activating, by the at least one processor, a locking mechanism of the designated storage compartment to lock the designated storage compartment after the item is positioned in the designated storage compartment; and activating, by the at least one processor, the locking mechanism of the designated storage compartment to unlock the designated storage compartment to allow removal of the item from the designated storage compartment.

Clause 11: The method of clause 10, further comprising: receiving an indication of a condition associated with the designated storage compartment of the autonomous vehicle from a user device.

Clause 12: The method of clauses 10 or 11, further comprising: determining whether the item has been removed from the designated storage compartment of the autonomous vehicle.

Clause 13: The method of any of clauses 10-12, wherein designating the storage compartment of the plurality of storage compartments for storage of the item as the designated storage compartment comprises: designating the storage compartment of the plurality of storage compartments for storage of the item as the designated storage compartment based on determining that the storage compartment has storage capacity for the item.

Clause 14: The method of any of clauses 10-13, further comprising: providing an indication of a position of the designated storage compartment of the autonomous vehicle to a user device.

Clause 15: The method of any of clauses 10-14, wherein determining that the one or more storage compartments of the plurality of storage compartments has storage capacity for the item comprises: comparing the data associated with the item to data associated with the one or more storage compartments of the autonomous vehicle; and determining that the data associated with the item corresponds to the data associated with the one or more storage compartments of the autonomous vehicle.

Clause 16: The method of any of clauses 9-15, further comprising: transmitting a notification to a user device based on determining that the item has not been removed from the designated storage compartment of the autonomous vehicle.

Clause 17: The method of any of clauses 9-16, further comprising: determining that the item has been positioned in the storage compartment of the autonomous vehicle; and causing the autonomous vehicle to travel on a route to a destination location based on determining that the item has been positioned in the designated storage compartment of the autonomous vehicle.

Clause 18: The method of any of clauses 9-17, further comprising: determining that the autonomous vehicle has arrived at the destination location; and determining whether the item has been removed from the designated storage compartment of the autonomous vehicle based on determining that the autonomous vehicle has arrived at the destination location.

Clause 19: An autonomous vehicle, comprising: a plurality of storage compartments, wherein each of the plurality of storage compartments comprises a locking mechanism configured to lock and unlock the plurality of storage compartments; and at least one processor programmed or configured to: receive data associated with an item to be positioned in a storage compartment of the plurality of storage compartments; determine that one or more storage compartments of the plurality of storage compartments has storage capacity for the item; designate a storage compartment of the plurality of storage compartments for storage of the item as a designated storage compartment; activate the locking mechanism of the designated storage compartment to lock the designated storage compartment after the item is positioned in the designated storage compartment; and activate the locking mechanism of the designated storage compartment to unlock the designated storage compartment to allow removal of the item from the designated storage compartment.

Clause 20: The autonomous vehicle of clause 19, wherein the at least one processor is further programmed or configured to: determine that the item has been positioned in the designated storage compartment of the autonomous vehicle; cause the autonomous vehicle to travel on a route to a destination location based on determining that the item has been positioned in the designated storage compartment of the autonomous vehicle; determine that the autonomous vehicle has arrived at the destination location; and determine whether the item has been removed from the designated storage compartment of the autonomous vehicle based on determining that the autonomous vehicle has arrived at the destination location.

BRIEF DESCRIPTION OF THE DRAWINGS

Additional advantages and details are explained in greater detail below with reference to the exemplary embodiments that are illustrated in the accompanying schematic figures, in which:

FIG. 12 is a flowchart of non-limiting embodiments of a process for managing access to an autonomous vehicle.

DESCRIPTION

Figure 1:
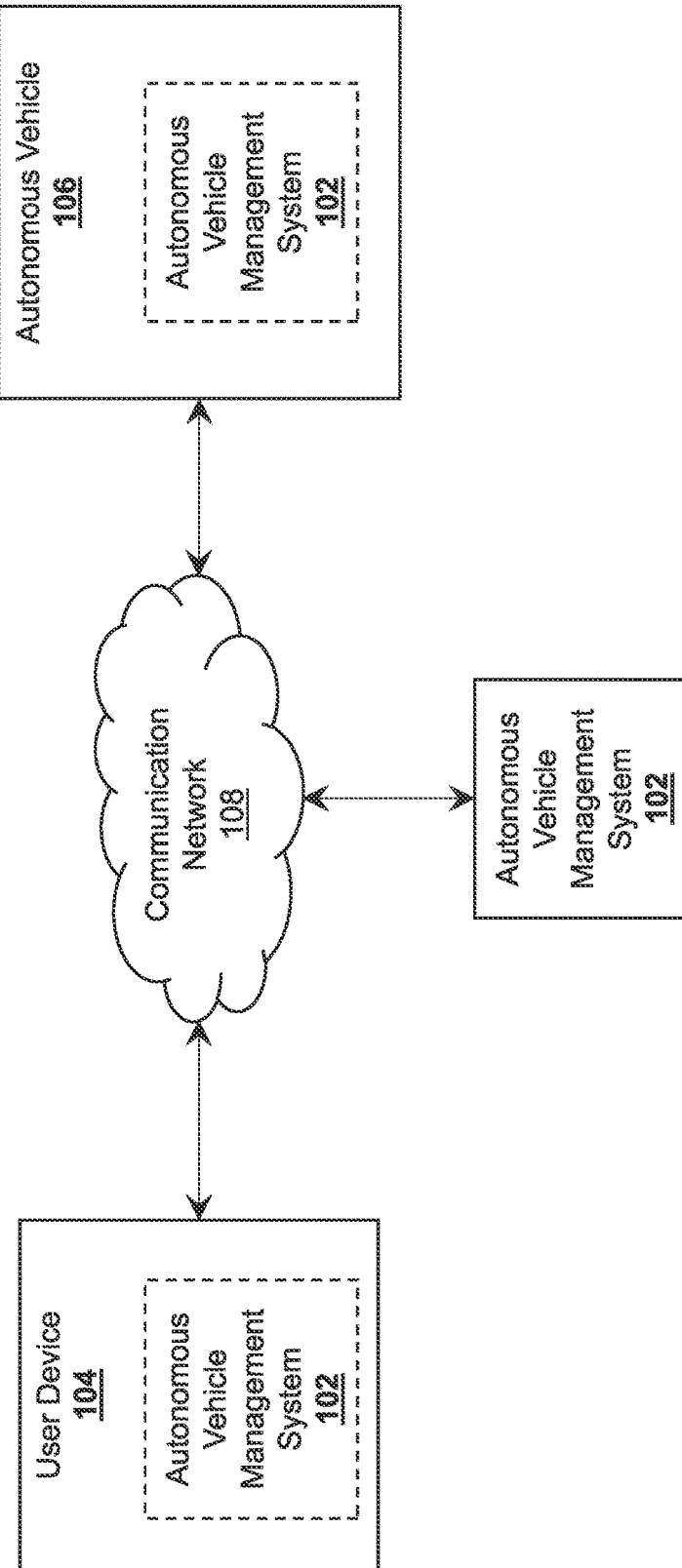
FIG. 1 is a diagram of non-limiting embodiments of an environment in which systems, methods, products, apparatuses, and/or devices, described herein, may be implemented.

It is to be understood that the present disclosure may assume various alternative variations and step sequences, except where expressly specified to the contrary. It is also to be understood that the specific devices and processes illustrated in the attached drawings, and described in the following specification, are simply exemplary and non-limiting embodiments. Hence, specific dimensions and other physical characteristics related to the embodiments disclosed herein are not to be considered as limiting.

No aspect, component, element, structure, act, step, function, instruction, and/or the like used herein should be construed as critical or essential unless explicitly described as such. Also, as used herein, the articles "a" and "an" are intended to include one or more items, and may be used interchangeably with "one or more" and "at least one." As used in the specification and the claims, the singular form of "a," "an," and "the" include plural referents, such as unless the context clearly dictates otherwise. Additionally, as used herein, the terms "set" and "group" are intended to include one or more items (e.g., related items, unrelated items, a combination of related and unrelated items, etc.) and may be used interchangeably with "one or more" or "at least one." Where only one item is intended, the term "one" or similar language is used. Also, as used herein, the terms "has," "have," "having," or the like are intended to be open-ended terms. Further, the phrase "based on" is intended to mean "based at least partially on" unless explicitly stated otherwise. Further, the phrase "based on" is intended to mean "based at least partially on" unless explicitly stated otherwise. Further, the phrase "based on" may mean "in response to" and be indicative of a condition for automatically triggering a specified operation of an electronic device (e.g., a processor, a computing device, etc.) as appropriately referred to herein.

As used herein, the term "communication" may refer to the reception, receipt, transmission, transfer, provision, and/or the like, of data (e.g., information, signals, messages, instructions, commands, and/or the like). For one unit (e.g., a device, a system, a component of a device or system, combinations thereof, and/or the like) to be in communication with another unit means that the one unit is able to directly or indirectly receive information from and/or transmit information to the other unit. This may refer to a direct or indirect connection (e.g., a direct communication connection, an indirect communication connection, and/or the like) that is wired and/or wireless in nature. Additionally, two units may be in communication with each other even though the information transmitted may be modified, processed, relayed, and/or routed between the first and second unit. For example, a first unit may be in communication with a second unit even though the first unit passively receives information and does not actively transmit information to the second unit. As another example, a first unit may be in communication with a second unit if at least one intermediary unit processes information received from the first unit and communicates the processed information to the second unit.

It will be apparent that systems and/or methods, described herein, can be implemented in different forms of hardware, software, or a combination of hardware and software. The actual specialized control hardware or software code used to implement these systems and/or methods is not limiting of the implementations. Thus, the operation and behavior of the systems and/or methods are described herein without reference to specific software code, it being understood that software and hardware can be designed to implement the systems and/or methods based on the description herein.

Some non-limiting embodiments are described herein in connection with thresholds. As used herein, satisfying a threshold may refer to a value being greater than the threshold, more than the threshold, higher than the threshold, greater than or equal to the threshold, less than the threshold, fewer than the threshold, lower than the threshold, less than or equal to the threshold, equal to the threshold, etc.

The term "vehicle" refers to any moving form of conveyance that is capable of carrying either one or more human occupants and/or cargo and is powered by any form of energy. The term "vehicle" includes, but is not limited to, cars, trucks, vans, trains, autonomous vehicles, aircraft, aerial drones, and the like. An "autonomous vehicle" is a vehicle having a processor, programming instructions, and drivetrain components that are controllable by the processor without requiring a human operator. An autonomous vehicle may be fully autonomous in that the autonomous vehicle does not require a human operator for most or all driving conditions and functions. In some non-limiting embodiments, the autonomous vehicle may be semi-autonomous in that a human operator may be required in certain conditions or for certain operations, or that a human operator may override the vehicle's autonomous system and may take control of the vehicle.

As used herein, the term "computing device" may refer to one or more electronic devices configured to process data. A computing device may, in some examples, include the necessary components to receive, process, and output data, such as a processor, a display, a memory, an input device, a network interface, and/or the like. In some non-limiting embodiments, a computing device may be a mobile device. As an example, a mobile device may include a cellular phone (e.g., a smartphone or standard cellular phone), a portable computer, a wearable device (e.g., watches, glasses, lenses, clothing, and/or the like), a personal digital assistant (PDA), and/or other like devices. In some non-limiting embodiments, a computing device may be non-mobile computer, such as a desktop computer.

As used herein, the term "server" and/or "processor" may refer to or include one or more computing devices that are operated by or facilitate communication and processing for multiple parties in a network environment, such as the Internet, although it will be appreciated that communication may be facilitated over one or more public or private network environments and that various other arrangements are possible. Further, multiple computing devices (e.g., servers, mobile devices, desktop computers, etc.) directly or indirectly communicating in the network environment may constitute a "system." Reference to "a server" or "a processor," as used herein, may refer to a previously-recited server and/or processor that is recited as performing a previous step or function, a different server and/or processor, and/or a combination of servers and/or processors. For example, as used in the specification and the claims, a first server and/or a first processor that is recited as performing a first step or function may refer to the same or different server and/or a processor recited as performing a second step or function.

As used herein, the term "user interface" or "graphical user interface" may refer to a display generated by a computing device, with which a user may interact, either directly or indirectly (e.g., through a keyboard, mouse, touchscreen, etc.).

An autonomous vehicle may be used in a service, such as a ridesharing service, in which multiple passengers and/or items are picked up at different locations and different times while the autonomous vehicle is travelling on a route to one or more destination locations. However, as each passenger and/or each item is picked up, there may be a problem associated with each passenger having an appropriate seating position, a problem associated with the time it takes for a passenger to find a seating position, a problem associated with the time it takes for one or more other passengers to become appropriately situated as a new passenger is picked up by the autonomous vehicle, and/or a problem with positioning an item to be positioned in the autonomous vehicle. In addition, a user of the service may have one or more items that the user intends to bring with the user while the autonomous vehicle is traveling to a destination. However, a problem may be encountered if there is not sufficient storage capacity on the autonomous vehicle. In addition, a problem may be encountered if the user is unable to place the one or more items in a storage compartment of the autonomous vehicle in an efficient and secure manner.

The present disclosure provides systems, methods, and computer program products that manage access to an autonomous vehicle. In some non-limiting embodiments, the present disclosure includes an autonomous vehicle management system to receive data associated with an item, such as an item being carried by a user, determine that an autonomous vehicle has a storage compartment with storage capacity for storage of the item, provide an indication of a reserved seating position for the user within the autonomous vehicle in an interior of the autonomous vehicle, cause an indication of ingress into the autonomous vehicle to be displayed by the autonomous vehicle, provide an indication of a seating position for the user within the autonomous vehicle to the user, and determine whether the item has been removed from the storage compartment of the autonomous vehicle. In some non-limiting embodiments, the autonomous vehicle management system may receive an indication of a condition associated with the storage compartment of the autonomous vehicle from a user device of the user. In some non-limiting embodiments, when providing the indication of the reserved seating position for the user within the autonomous vehicle, the autonomous vehicle management system may provide the indication of the reserved seating position for the user within the autonomous vehicle on a display screen of the autonomous vehicle. In some non-limiting embodiments, when causing the indication of ingress into the autonomous vehicle to be displayed by the autonomous vehicle, the autonomous vehicle management system may cause one or more light sources positioned on a door of the autonomous vehicle to illuminate. In some non-limiting embodiments, when providing the indication of a seating position inside of the autonomous vehicle to the user, the autonomous vehicle management system may cause a graphical user interface (GUI) of a mobile application on a user device of the user to display the indication of the seating position for the user inside of the autonomous vehicle. In some non-limiting embodiments, when determining that the autonomous vehicle has a storage compartment with storage capacity for storage of the item, the autonomous vehicle management system may compare the data associated with the item to data associated with one or more storage compartments of the autonomous vehicle and determine that the data associated with the item corresponds to the data associated with the one or more storage compartments of the autonomous vehicle. In some non-limiting embodiments, the autonomous vehicle management system may transmit a notification to a user device of the user based on determining that the item has not been removed from the storage compartment of the autonomous vehicle. In some non-limiting embodiments, the autonomous vehicle management system may determine that the item has been positioned in the storage compartment of the autonomous vehicle and cause the autonomous vehicle to travel on a route to a destination location based on determining that the item has been positioned in the storage compartment of the autonomous vehicle. In some non-limiting embodiments, the autonomous vehicle management system may determine that the autonomous vehicle has arrived at the destination location and, when determining whether the item has been removed from the storage compartment of the autonomous vehicle, the autonomous vehicle management system may determine whether the item has been removed from the storage compartment of the autonomous vehicle based on determining that the autonomous vehicle has arrived at the destination location.

In some non-limiting embodiments, the present disclosure includes an autonomous vehicle management system that includes an autonomous vehicle, including a plurality of storage compartments, wherein each of the plurality of storage compartments comprises a locking mechanism configured to lock and unlock the storage compartment and at least one processor to receive data associated with an item, such as an item to be positioned in a storage compartment of an autonomous vehicle, determine that one or more storage compartments of the plurality of storage compartments has storage capacity for the item, designate a storage compartment of the plurality of storage compartments for storage of the item as a designated storage compartment, activate the locking mechanism of the designated storage compartment to lock the designated storage compartment after the item is positioned in the designated storage compartment, and activate the locking mechanism of the designated storage compartment to unlock the designated storage compartment to allow removal of the item from the designated storage compartment. In some non-limiting embodiments, the autonomous vehicle management system may receive an indication of a condition associated with the designated storage compartment of the autonomous vehicle from a user device of a user. In some non-limiting embodiments, the autonomous vehicle management system may determine whether the item has been removed from the designated storage compartment of the autonomous vehicle. In some non-limiting embodiments, when designating the storage compartment of the plurality of storage compartments for storage of the item as the designated storage compartment, the autonomous vehicle management system may designate the storage compartment of the plurality of storage compartments for storage of the item as the designated storage compartment based on determining that the storage compartment has storage capacity for the item. In some non-limiting embodiments, the autonomous vehicle management system may provide an indication of a position of the designated storage compartment of the autonomous vehicle to a user device. In some non-limiting embodiments, when determining that the one or more storage compartments of the plurality of storage compartments has storage capacity for the item, the autonomous vehicle management system may compare the data associated with the item to data associated with the one or more storage compartments of the autonomous vehicle and determine that the data associated with the item corresponds to the data associated with the one or more storage compartments of the autonomous vehicle. In some non-limiting embodiments, the autonomous vehicle management system may transmit a notification to a user device based on determining that the item has not been removed from the designated storage compartment of the autonomous vehicle. In some non-limiting embodiments, the autonomous vehicle management system may determine that the item has been positioned in the designated storage compartment of the autonomous vehicle and cause the autonomous vehicle to travel on a route to a destination location based on determining that the item has been positioned in the designated storage compartment of the autonomous vehicle. In some non-limiting embodiments, the autonomous vehicle management system may determine that the autonomous vehicle has arrived at the destination location and determine whether the item has been removed from the designated storage compartment of the autonomous vehicle based on determining that the autonomous vehicle has arrived at the destination location.

In this way, the autonomous vehicle management system may alleviate problems associated with each passenger having an appropriate seating position, the time it takes for a passenger to find a seating position, the time it takes for one or more other passengers to become appropriately situated as a new passenger, such as the user, is picked up by an autonomous vehicle, and the time it takes to securely position an item in a storage compartment of the autonomous vehicle. In addition, the autonomous vehicle management system may alleviate problems associated with insufficient storage capacity of storage compartments in the autonomous vehicle, along with providing the user a way to place the one or more items in a storage compartment of the autonomous vehicle in an efficient and secure manner. Furthermore, the autonomous vehicle management system may reduce an amount of time it takes for the autonomous vehicle to travel a route to a destination location by reducing an amount of time it takes for the user to store the item and/or to embark on the autonomous vehicle to a destination location.

Referring now to FIG. 1, FIG. 1 is a diagram of an example environment 100 in which systems, methods, products, apparatuses, and/or devices described herein, may be implemented. As shown in FIG. 1, environment 100 may include autonomous vehicle management system 102, user device 104, autonomous vehicle 106, and communication network 108.

Autonomous vehicle management system 102 may include one or more devices capable of communicating with user device 104 and/or autonomous vehicle 106 via communication network 108. For example, autonomous vehicle management system 102 may include a computing device, such as a server, a group of servers, and/or other like devices.

User device 104 may include one or more devices capable of communicating with autonomous vehicle management system 102 and/or autonomous vehicle 106 via communication network 108. For example, autonomous vehicle management system 102 may include a computing device, such as a mobile device, a desktop computer, and/or other like devices. In some non-limiting embodiments, autonomous vehicle management system 102 may communicate with user device 104 via an application (e.g., a mobile application) stored on user device 104. In some non-limiting embodiments, user device 104 may include an image capture device (e.g., a camera, a stereo camera, etc.) and/or one or more sensors (e.g., a LiDAR sensor, a radio frequency identification (RFID) sensor, a light sensor, an image sensor, a laser sensor, a barcode reader, an audio sensor, etc.).

Autonomous vehicle 106 may include one or more devices capable of communicating with autonomous vehicle management system 102 and/or user device 104 via communication network 108. For example, autonomous vehicle 106 may include a computing device, such as a server, a group of servers, and/or other like devices. In some non-limiting embodiments, autonomous vehicle management system 102 may be a component of autonomous vehicle 106. In some non-limiting embodiments, user device 104 may be a component of autonomous vehicle 106.

Communication network 108 may include one or more wired and/or wireless networks. For example, communication network 108 may include a cellular network (e.g., a long-term evolution (LTE) network, a third generation (3G) network, a fourth generation (4G) network, a fifth generation (5G) network, a code division multiple access (CDMA) network, etc.), a public land mobile network (PLMN), a local area network (LAN), a wide area network (WAN), a metropolitan area network (MAN), a telephone network (e.g., the public switched telephone network (PSTN)), a private network, an ad hoc network, an intranet, the Internet, a fiber optic-based network, a cloud computing network, and/or the like, and/or a combination of these or other types of networks.

The number and arrangement of devices and systems shown in FIG. 1 is provided as an example. There may be additional devices and/or systems, fewer devices and/or systems, different devices and/or systems, or differently arranged devices and/or systems than those shown in FIG. 1. Furthermore, two or more devices and/or systems shown in FIG. 1 may be implemented within a single device and/or system, or a single device and/or system shown in FIG. 1 may be implemented as multiple, distributed devices and/or systems. For example, autonomous vehicle 106 may incorporate the functionality of autonomous vehicle management system 102 such that autonomous vehicle 106 can operate without communication to or from autonomous vehicle management system 102. Additionally or alternatively, a set of devices and/or systems (e.g., one or more devices or systems) of environment 100 may perform one or more functions described as being performed by another set of devices and/or systems of environment 100.

Figure 2:
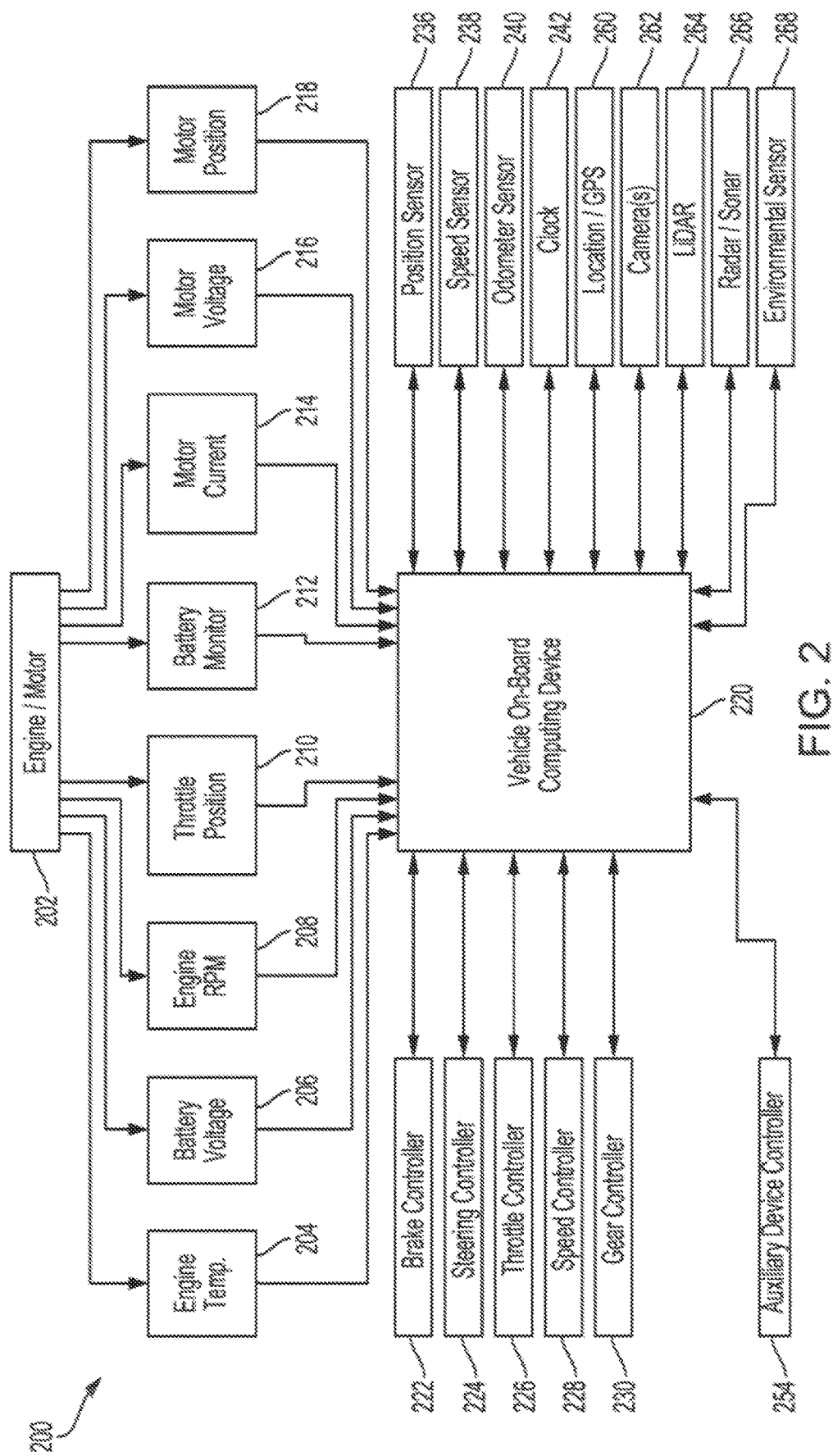
FIG. 2 is an illustration of an architecture for an autonomous vehicle.

Referring now to FIG. 2, FIG. 2 is an illustration of an illustrative system architecture 200 for a vehicle. Autonomous vehicle 106 may include a same or similar system architecture as that of system architecture 200 shown in FIG. 2.

As shown in FIG. 2, system architecture 200 may include engine or motor 202 and various sensors 204-218 for measuring various parameters of the vehicle. In gas-powered or hybrid vehicles having a fuel-powered engine, the sensors may include, for example, engine temperature sensor 204, battery voltage sensor 206, engine Rotations Per Minute ("RPM") sensor 208, throttle position sensor 210, and/or a seat occupancy sensor (not shown). In an electric or hybrid vehicle, the vehicle may have an electric motor, and may have sensors, such as battery monitor sensor 212 (e.g., to measure current, voltage, and/or temperature of the battery), motor current sensor 214, motor voltage sensor 216, and/or motor position sensors 218, such as resolvers and encoders.

System architecture 200 may include operational parameter sensors, which may be common to both types of vehicles, and may include, for example: position sensor 236 such as an accelerometer, gyroscope, and/or inertial measurement unit; speed sensor 238; and/or odometer sensor 240. System architecture 200 may include clock 242 that are used to determine vehicle time during operation. Clock 242 may be encoded into the vehicle's on-board computing device 220, it may be a separate device, or multiple clocks may be available.

System architecture 200 may include various sensors that operate to gather information about an environment in which the vehicle is operating and/or traveling. These sensors may include, for example: location sensor 260 (e.g., a Global Positioning System ("GPS") device); object detection sensors, such as one or more cameras 262; LiDAR sensor system 264; and/or radar and/or sonar system 266. The sensors may include environmental sensors 268, such as a precipitation sensor, an ambient temperature sensor, and/or an acoustic sensor (e.g., a microphone, a phased-array of microphones, and/or the like). The object detection sensors may enable system architecture 200 to detect objects that are within a given distance range of the vehicle in any direction, and the environmental sensors 268 may collect data about environmental conditions within an area of operation and/or travel of the vehicle.

During operation of system architecture 200, information is communicated from the sensors of system architecture 200 to on-board computing device 220. On-board computing device 220 analyzes the data captured by the sensors and optionally controls operations of the vehicle based on results of the analysis. For example, on-board computing device 220 may control: braking via a brake controller 222; direction via steering controller 224; speed and acceleration via throttle controller 226 (e.g., in a gas-powered vehicle) or motor speed controller 228, such as a current level controller (e.g., in an electric vehicle); differential gear controller 230 (e.g., in vehicles with transmissions); and/or other controllers, such as auxiliary device controller 254.

Geographic location information may be communicated from location sensor 260 to on-board computing device 220, which may access a map of the environment including map data that corresponds to the location information to determine known fixed features of the environment, such as streets, buildings, stop signs and/or stop/go signals. Captured images from cameras 262 and/or object detection information captured from sensors, such as LiDAR sensor system 264 is communicated from those sensors to on-board computing device 220. The object detection information and/or captured images are processed by on-board computing device 220 to detect objects in proximity to the vehicle. Any known or to be known technique for making an object detection based on sensor data and/or captured images can be used in the embodiments disclosed in this document.

Figure 3:
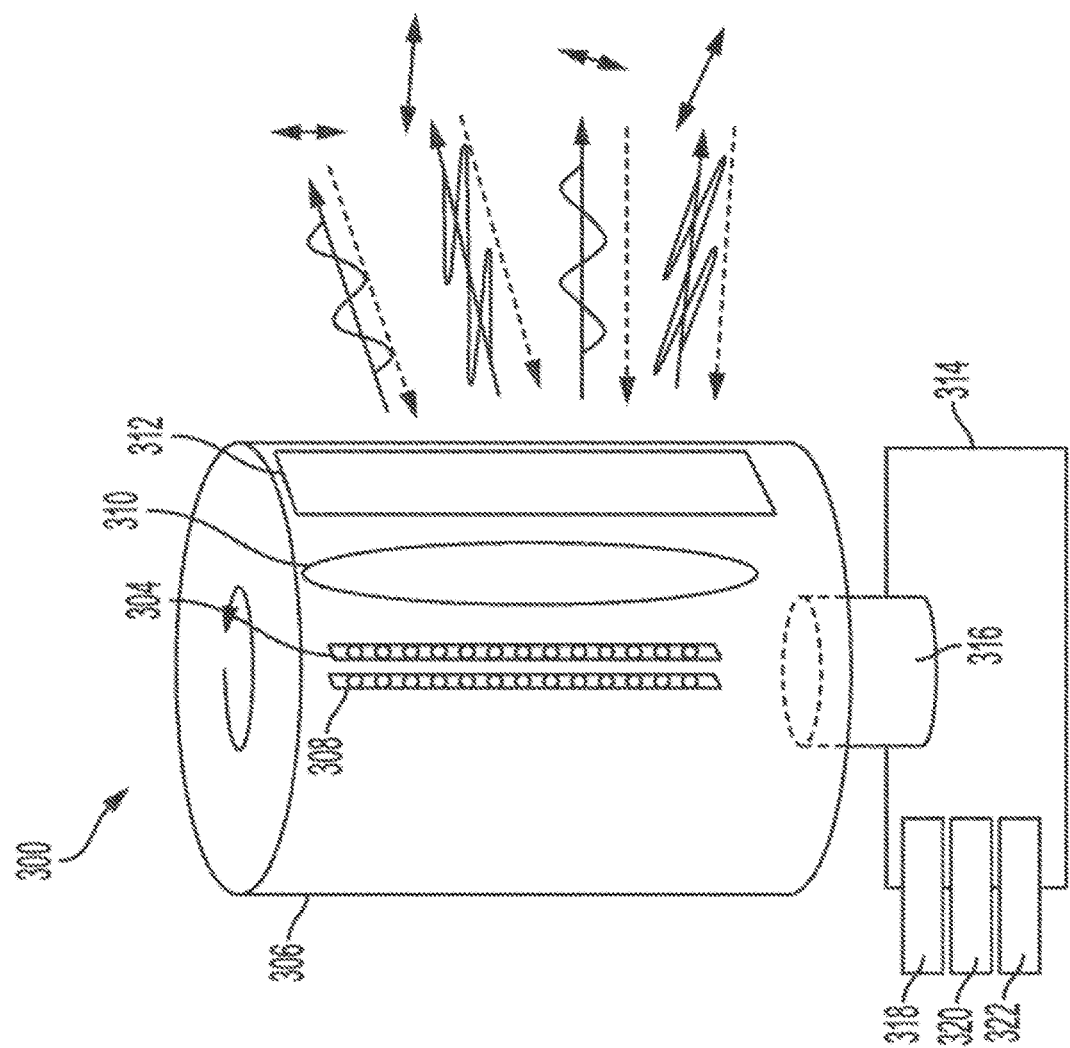
FIG. 3 is an illustration of an architecture for a LiDAR system.

Referring now to FIG. 3, FIG. 3 is an illustration of an illustrative LiDAR system 300. LiDAR sensor system 264 of FIG. 2 may be the same as or substantially similar to LiDAR system 300.

As shown in FIG. 3, LiDAR system 300 may include housing 306, which may be rotatable 360° about a central axis, such as hub or axle 316. Housing 306 may include an emitter/receiver aperture 312 made of a material transparent to light (e.g., transparent to infrared light). Although a single aperture is shown in FIG. 3, non-limiting embodiments of the present disclosure are not limited in this regard. In other scenarios, multiple apertures for emitting and/or receiving light may be provided. Either way, LiDAR system 300 can emit light through one or more of aperture(s) 312 and receive reflected light back toward one or more of aperture (s) 312 as housing 306 rotates around the internal components. In an alternative scenario, the outer shell of housing 306 may be a stationary dome, at least partially made of a material that is transparent to light, with rotatable components inside of housing 306.

Inside the rotating shell or stationary dome is a light emitter system 304 that is configured and positioned to generate and emit pulses of light through aperture 312 or through the transparent dome of housing 306 via one or more laser emitter chips or other light emitting devices. Light emitter system 304 may include any number of individual emitters (e.g., 8 emitters, 64 emitters, 128 emitters, etc.). The emitters may emit light of substantially the same intensity or of varying intensities. The individual beams emitted by light emitter system 304 may have a well-defined state of polarization that is not the same across the entire array. As an example, some beams may have vertical polarization and other beams may have horizontal polarization. LiDAR system 300 may include light detector 308 containing a photodetector or array of photodetectors positioned and configured to receive light reflected back into the system. Light emitter system 304 and light detector 308 may rotate with the rotating shell, or light emitter system 304 and light detector 308 may rotate inside the stationary dome of housing 306. One or more optical element structures 310 may be positioned in front of light emitter system 304 and/or light detector 308 to serve as one or more lenses and/or waveplates that focus and direct light that is passed through optical element structure 310.

One or more optical element structures 310 may be positioned in front of a mirror to focus and direct light that is passed through optical element structure 310. As described herein below, LiDAR system 300 may include optical element structure 310 positioned in front of a mirror and connected to the rotating elements of LiDAR system 300 so that optical element structure 310 rotates with the mirror. Alternatively or in addition, optical element structure 310 may include multiple such structures (e.g., lenses, waveplates, etc.). In some non-limiting embodiments, multiple optical element structures 310 may be arranged in an array on or integral with the shell portion of housing 306.

In some non-limiting embodiments, each optical element structure 310 may include a beam splitter that separates light that the system receives from light that the system generates. The beam splitter may include, for example, a quarter-wave or half-wave waveplate to perform the separation and ensure that received light is directed to the receiver unit rather than to the emitter system (which could occur without such a waveplate as the emitted light and received light should exhibit the same or similar polarizations).

LiDAR system 300 may include power unit 318 to power the light emitter system 304, motor 316, and electronic components. LiDAR system 300 may include an analyzer 314 with elements, such as processor 322 and non-transitory computer-readable memory 320 containing programming instructions that are configured to enable the system to receive data collected by the light detector unit, analyze the data to measure characteristics of the light received, and generate information that a connected system can use to make decisions about operating in an environment from which the data was collected. Analyzer 314 may be integral with LiDAR system 300 as shown, or some or all of analyzer 314 may be external to LiDAR system 300 and communicatively connected to LiDAR system 300 via a wired and/or wireless communication network or link.

Figure 4:
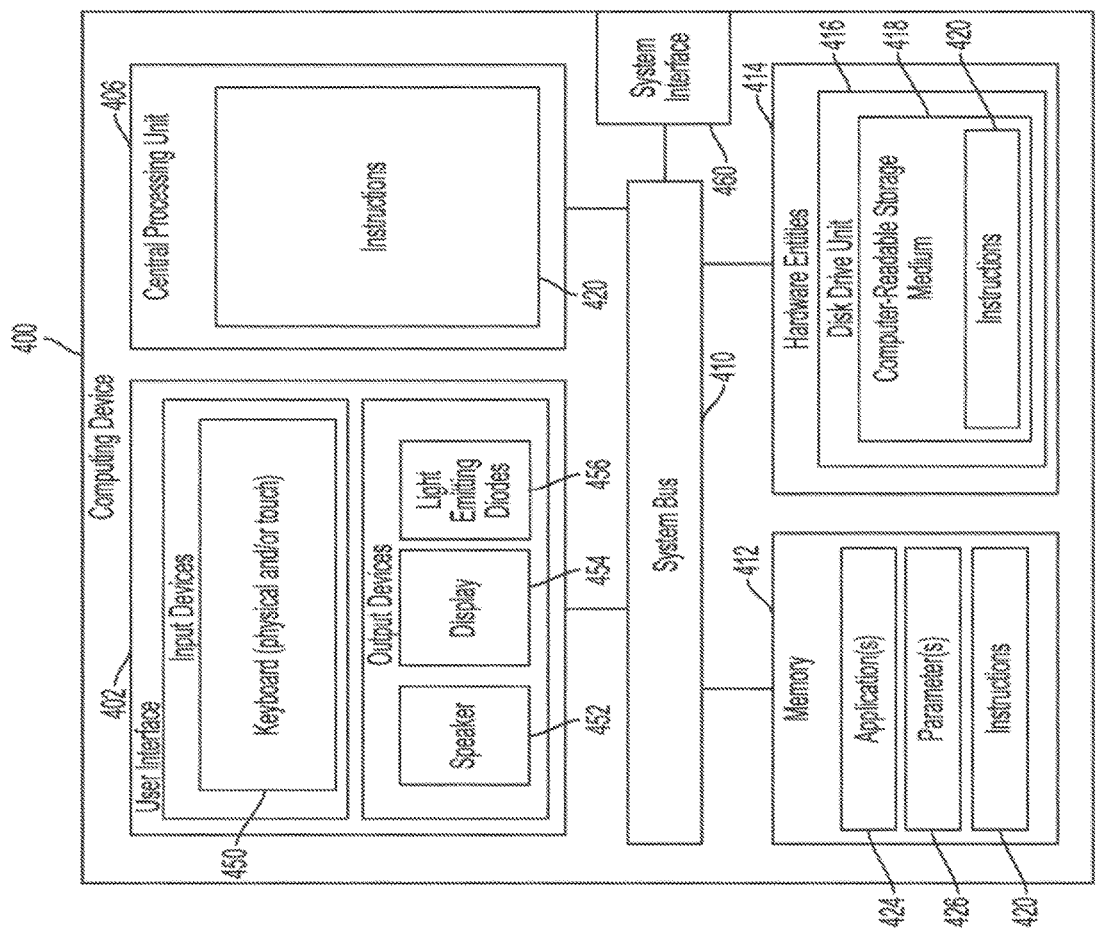
FIG. 4 is an illustration of a computing device.

Referring now to FIG. 4, FIG. 4 is an illustration of an illustrative architecture for a computing device 400. Computing device 400 can correspond to one or more devices of (e.g., one or more devices of a system of) autonomous vehicle management system 102, user device 104, and/or one or more devices of autonomous vehicle 106 (e.g., one or more devices of systems architecture 200, etc.). In some non-limiting embodiments, one or more devices of (e.g., one or more devices of a system of) autonomous vehicle management system 102, user device 104, and/or autonomous vehicle 106 (e.g., one or more devices of system architecture 200, etc.) can include at least one computing device 400 and/or at least one component of computing device 400.

The number and arrangement of components shown in FIG. 4 are provided as an example. In some non-limiting embodiments, computing device 400 may include additional components, fewer components, different components, or differently arranged components than those shown in FIG. 4. Additionally or alternatively, a set of components (e.g., one or more components) of computing device 400 may perform one or more functions described as being performed by another set of components of computing device 400.

As shown in FIG. 4, computing device 400 comprises user interface 402, Central Processing Unit ("CPU") 406, system bus 410, memory 412 connected to and accessible by other portions of computing device 400 through system bus 410, system interface 460, and hardware entities 414 connected to system bus 410. User interface 402 can include input devices and output devices, which facilitate user-software interactions for controlling operations of computing device 400. The input devices may include, but are not limited to, physical and/or touch keyboard 450. The input devices can be connected to computing device 400 via a wired and/or wireless connection (e.g., a Bluetooth® connection). The output devices may include, but are not limited to, speaker 452, display 454, and/or light emitting diodes 456. System interface 460 is configured to facilitate wired and/or wireless communications to and from external devices (e.g., network nodes, such as access points, etc.).

At least some of hardware entities 414 may perform actions involving access to and use of memory 412, which can be a Random Access Memory ("RAM"), a disk drive, flash memory, a Compact Disc Read Only Memory ("CD-ROM") and/or another hardware device that is capable of storing instructions and data. Hardware entities 414 can include disk drive unit 416 comprising computer-readable storage medium 418 on which is stored one or more sets of instructions 420 (e.g., software code) configured to implement one or more of the methodologies, procedures, or functions described herein. Instructions 420, applications 424, and/or parameters 426 can also reside, completely or at least partially, within memory 412 and/or within CPU 406 during execution and/or use thereof by computing device 400. Memory 412 and CPU 406 may include machine-readable media. The term "machine-readable media", as used here, may refer to a single medium or multiple media (e.g., a centralized or distributed database, and/or associated caches and server) that store the one or more sets of instructions 420. The term "machine readable media", as used here, may refer to any medium that is capable of storing, encoding, or carrying a set of instructions 420 for execution by computing device 400 and that cause computing device 400 to perform any one or more of the methodologies of the present disclosure.

Figure 5:
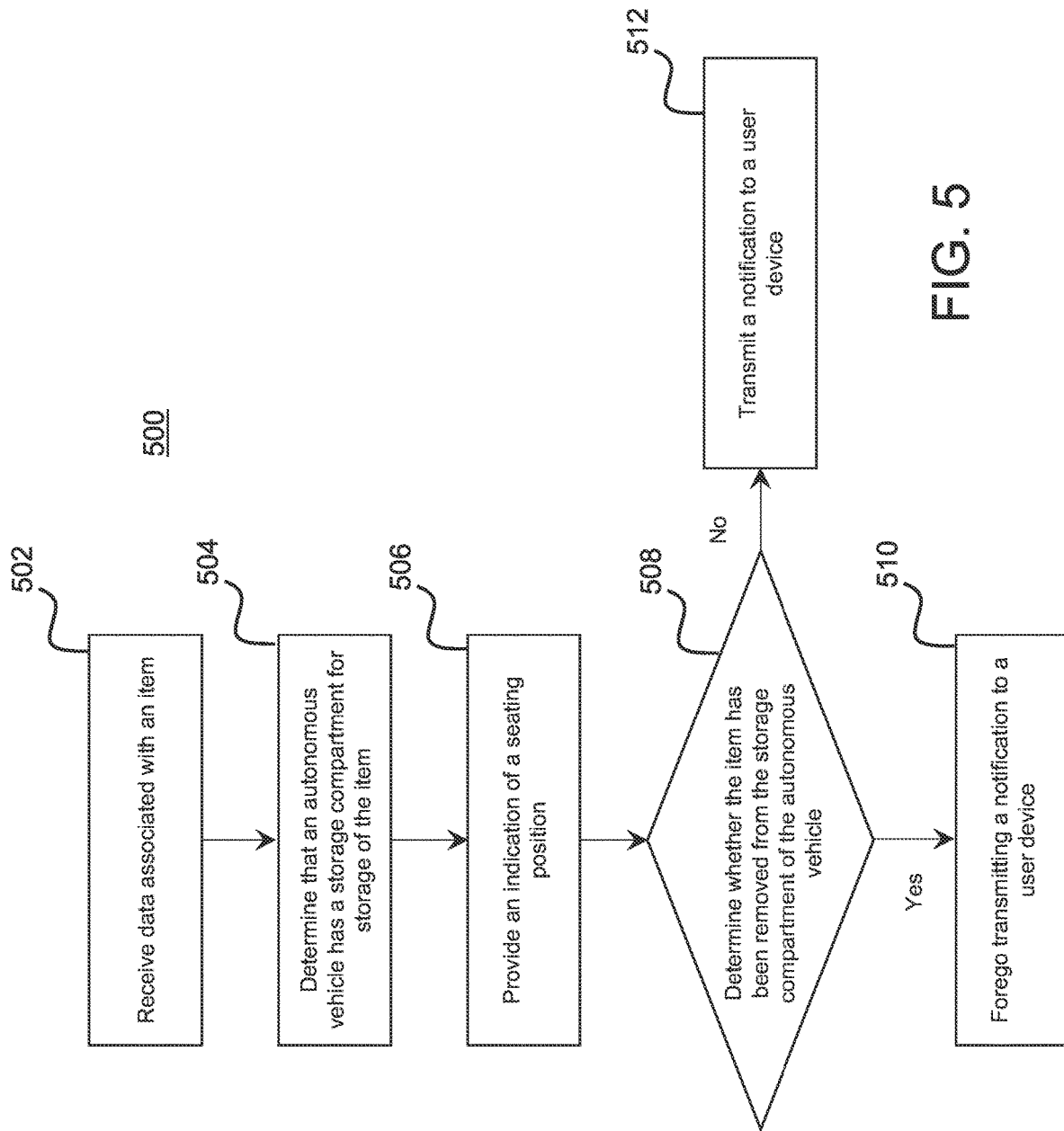
FIG. 5 is a flowchart of non-limiting embodiments of a process for managing access to an autonomous vehicle.

Referring now to FIG. 5, FIG. 5 is a flowchart of non-limiting embodiments of a process 500 for managing access to an autonomous vehicle. In some non-limiting embodiments, one or more of the steps of process 500 may be performed (e.g., completely, partially, etc.) by autonomous vehicle management system 102 (e.g., one or more devices of autonomous vehicle management system 102, etc.). In some non-limiting embodiments, one or more of the steps of process 500 may be performed (e.g., completely, partially, etc.) by another device or a group of devices separate from or including autonomous vehicle management system 102, such as user device 104 and/or autonomous vehicle 106 (e.g., system architecture 200, etc.).

As shown in FIG. 5, at step 502, process 500 includes receiving data associated with an item. For example, autonomous vehicle management system 102 may receive data associated with the item from user device 104 and/or autonomous vehicle 106. In some non-limiting embodiments, the item may include baggage (e.g., luggage, suitcases, bags, cases, containers, envelopes, boxes, etc.) and/or any object that is associated with (e.g., carried by, such as presently carried by, previously carried by, to be carried by, etc.) the user. In some non-limiting embodiments, the item may include an item to be positioned in a storage compartment of autonomous vehicle 106. For example, the item may include cargo (e.g., a shipment, a package, a container of goods, etc.), a food item for delivery to a location, and/or any other object to be positioned in a storage compartment of autonomous vehicle 106. In some non-limiting embodiments, a user of user device 104 may include an individual that is a passenger in autonomous vehicle 106, was a passenger in autonomous vehicle 106, or will be a passenger in autonomous vehicle 106. Additionally or alternatively, the user of user device 104 may include an individual that uses a service associated with autonomous vehicle (e.g., a ride-sharing service that operates autonomous vehicle 106, a delivery service that operates autonomous vehicle 106, etc.).

In some non-limiting embodiments, autonomous vehicle management system 102 may receive the data associated with the item from user device 104 of the user. For example, the user of user device 104 may capture an image of the item via an image capture device (e.g., a camera) of user device 104. User device 104 may generate data associated with the item based on the image of the item user and/or based on a user input from the user provided to user device 104, and user device 104 may transmit the data to autonomous vehicle management system 102. In such an example, autonomous vehicle management system 102 may receive the data associated with the item from user device 104 based on user device 104 transmitting the data.

In some non-limiting embodiments, the user of user device 104 may use a mobile application of user device 104 to scan the item and/or a storage compartment of autonomous vehicle 106. In some non-limiting embodiments, user device 104 may generate data associated with the item and/or data associated with the storage compartment of autonomous vehicle 106 based on using the mobile application to scan the item and/or the storage compartment of autonomous vehicle 106. In some non-limiting embodiments, a storage compartment of autonomous vehicle 106 may include a trunk (e.g., a compartment positioned at a rear of a vehicle) of autonomous vehicle 106, a frunk (e.g., a compartment positioned at a front of a vehicle) of autonomous vehicle 106, a passenger compartment of autonomous vehicle 106 that serves as a storage compartment (e.g., a passenger storage compartment), an exterior storage compartment of autonomous vehicle 106, such as a rooftop storage compartment, a storage container of autonomous vehicle 106, such as a lockable storage container (e.g., a locker, a safe, a bin, etc., with a locking mechanism) within an interior or positioned on an exterior of autonomous vehicle 106, and/or the like. In some non-limiting embodiments, the storage compartment of autonomous vehicle 106 may include a storage container that is removable and replaceable within (e.g., inside of) autonomous vehicle 106. For example, the storage compartment of autonomous vehicle 106 may include a storage container that is removable and replaceable within another storage compartment of autonomous vehicle 106, such as a trunk, a frunk, a passenger compartment (e.g., a seat within a passenger compartment, a space in a passenger compartment where a seat was removed from, etc.), an exterior storage compartment, and/or the like. In some non-limiting embodiments, autonomous vehicle 106 may include a plurality of storage compartments. For example, autonomous vehicle 106 may include any combination of a trunk, a frunk, a passenger compartment that serves as a storage compartment, an exterior storage compartment, or a storage container. In some non-limiting embodiments, a storage compartment may be divided into a plurality of storage compartments. For example, a trunk, a frunk, a passenger compartment that serves as a storage compartment, an exterior storage compartment, and/or a storage container of autonomous vehicle 106 may be divided into a plurality of storage compartments.

In some non-limiting embodiments, each storage compartment of the plurality of storage compartments may include a locking mechanism configured to lock and unlock the storage compartment. In some non-limiting embodiments, a group of storage compartments may be locked or unlocked via a single locking mechanism. In some non-limiting embodiments, each storage compartment of the plurality of storage compartments may be locked or unlocked individually, without locking or unlocking other storage compartments of the plurality of storage compartments, or simultaneously, where all storage compartments are locked or unlocked at the same time. In some non-limiting embodiments, the locking mechanism may include a manually operated locking mechanism (e.g., a mechanical lock that operates based on a key or a code entered into a combination dial, such as a padlock, a combination lock, etc.) or an electronically operated locking mechanism (e.g., an electronic lock that operates based on signals received from an electronic device, such as a processor). In some non-limiting embodiments, the locking mechanism may include a car door lock (e.g., a car door lock assembly), a trunk lock (e.g., a trunk latch, a trunk latch assembly, etc.), a frunk lock (e.g., a hood latch, a frunk latch, a hood latch assembly, a frunk latch assembly, etc.) of autonomous vehicle 106.

In some non-limiting embodiments, a storage compartment of autonomous vehicle 106 may be divided into sub-compartments for storage of an item that is sized and configured to fit within a sub-compartment. In some non-limiting embodiments, one or more sub-compartments of the storage compartment may be locked or unlocked individually, without locking or unlocking other sub-compartments of the storage compartment, or simultaneously, where all sub-compartments are locked or unlocked at the same time. In some non-limiting embodiments, the plurality of sub-compartments may be locked or unlocked via a locking mechanism.

In some non-limiting embodiments, autonomous vehicle management system 102, user device 104, and/or autonomous vehicle 106 may generate the data associated with the item based on sensor data associated with the item from one or more sensors and/or image data associated with an image of the item. In some non-limiting embodiments, the one or more sensors may be positioned on an item (e.g., an RFID sensor positioned on the baggage of the user). For example, the one or more sensors may be integrated into the item, may be attached to the item, may be separable from the item, and/or the like. In some non-limiting embodiments, the one or more sensors may be positioned on autonomous vehicle 106 (e.g., one or more sensors of system architecture 200). For example, the one or more sensors may be positioned on a storage compartment, positioned on a door, positioned on a point of ingress or egress, positioned in a seat (e.g., a seat occupancy sensor), and/or the like, of autonomous vehicle 106. In some non-limiting embodiments, the one or more sensors may include a plurality of sensors, at least one of which is positioned on the item and at least one of which is positioned on autonomous vehicle 106. The plurality of sensors may be in communication with each other.

In some non-limiting embodiments, data associated with an item may include characteristics of the item. For example, the data associated with the item may include characteristics (e.g., dimensions, structure, such as size, shape, appearance, and/or weight, quantity, temperature, substance, such as a material makeup, etc.) of the item. In some non-limiting embodiments, the data associated with the item may include measurements (e.g., dimensions, area, volume, density, etc.) of the item. For example, the data associated with the item may include dimensional measurements, area measurements, volume measurements, density measurements, and/or the like, of the item.

In some non-limiting embodiments, data associated with a storage compartment of autonomous vehicle 106 may include characteristics of the storage compartment of autonomous vehicle 106. For example, the data associated with the storage compartment of autonomous vehicle 106 may include characteristics (e.g., dimensions of the storage compartment, structure of the storage compartment, such as size, shape, appearance of the storage compartment, temperature of the storage compartment, structure of the item positioned in the storage compartment, such as size, shape, appearance, and/or weight of the item positioned in the storage compartment, quantity of the item positioned in the storage compartment, temperature of the item positioned in the storage compartment, substance of the item positioned in the storage compartment, etc.) of the storage compartment. In some non-limiting embodiments, the data associated with the storage compartment may include measurements (e.g., dimensions, area, volume, etc.) of the storage compartment. For example, the data associated with the item may include dimensional measurements, area measurements, volume measurements, and/or the like, of the storage compartment.

In some non-limiting embodiments, autonomous vehicle management system 102 may receive an image of the item. In one example, user device 104 may capture the image of the item via an image capture device of user device 104 and user device 104 may transmit the image of the item to autonomous vehicle management system 102. Autonomous vehicle management system 102 may receive the image based on user device 104 transmitting the image. In another example, autonomous vehicle 106 may capture the image of the item via an image capture device of autonomous vehicle 106 and autonomous vehicle 106 may transmit the image of the item to autonomous vehicle management system 102. In some non-limiting embodiments, autonomous vehicle management system 102 may receive sensor data associated with the item. For example, autonomous vehicle management system 102 may receive the sensor data associated with the item from one or more sensors, where the sensor data is based on readings of the one or more sensors with regard to the item. In some non-limiting embodiments, the one or more sensors may be associated with user device 104 or the one or more sensors may be associated with autonomous vehicle 106. In one example, the one or more sensors may be a component of user device 104 or a peripheral of user device 104. In another example, the one or more sensors may be a component of autonomous vehicle 106.

In some non-limiting embodiments, autonomous vehicle management system 102 may determine a characteristic and/or a measurement of the item. For example, autonomous vehicle management system 102 may determine the characteristic and/or the measurement of the item based on an image of the item and/or sensor data associated with the item. In some non-limiting embodiments, autonomous vehicle management system 102 may determine the characteristic and/or the measurement of the item using a machine learning algorithm. For example, autonomous vehicle management system 102 may determine the characteristic and/or the measurement of the item using the machine learning algorithm on the image of the item and/or the sensor data associated with the item. In some non-limiting embodiments, autonomous vehicle management system 102 may determine a characteristic and/or a measurement of a storage compartment of autonomous vehicle 106. For example, autonomous vehicle management system 102 may determine the characteristic and/or the measurement of the storage compartment of autonomous vehicle 106 based on an image of the storage compartment of autonomous vehicle 106 and/or sensor data associated with the storage compartment of autonomous vehicle 106. In some non-limiting embodiments, autonomous vehicle management system 102 may determine the characteristic and/or the measurement of the storage compartment of autonomous vehicle 106 using a machine learning algorithm. For example, autonomous vehicle management system 102 may determine the characteristic and/or the measurement of the storage compartment of autonomous vehicle 106 using the machine learning algorithm on the image of the storage compartment of autonomous vehicle 106 and/or the sensor data associated with the storage compartment of autonomous vehicle 106.

In some non-limiting embodiments, user device 104 may determine a characteristic and/or a measurement of the item. For example, user device 104 may determine the characteristic and/or the measurement of the item based on an image of the item and/or sensor data associated with the item. In some non-limiting embodiments, user device 104 may determine the characteristic and/or the measurement of the item using a machine learning algorithm. For example, user device 104 may determine the characteristic and/or the measurement of the item using the machine learning algorithm on the image of the item and/or the sensor data associated with the item. In some non-limiting embodiments, user device 104 may determine a characteristic and/or a measurement of the storage compartment of autonomous vehicle 106. For example, user device 104 may determine the characteristic and/or the measurement of the storage compartment of autonomous vehicle 106 based on an image of the storage compartment of autonomous vehicle 106 and/or sensor data associated with the storage compartment of autonomous vehicle 106. In some non-limiting embodiments, user device 104 may determine the characteristic and/or the measurement of the storage compartment of autonomous vehicle 106 using a machine learning algorithm. For example, user device 104 may determine the characteristic and/or the measurement of the storage compartment of autonomous vehicle 106 using the machine learning algorithm on the image of the item and/or the sensor data associated with the storage compartment of autonomous vehicle 106.

In some non-limiting embodiments, autonomous vehicle 106 may determine a characteristic and/or a measurement of the item. For example, autonomous vehicle 106 may determine the characteristic and/or the measurement of the item based on an image of the item and/or sensor data associated with the item. In some non-limiting embodiments, autonomous vehicle 106 may determine the characteristic and/or the measurement of the item using a machine learning algorithm. For example, autonomous vehicle 106 may determine the characteristic and/or the measurement of the item using the machine learning algorithm on the image of the item and/or the sensor data associated with the item. In some non-limiting embodiments, autonomous vehicle 106 may determine a characteristic and/or a measurement of the storage compartment of autonomous vehicle 106. For example, autonomous vehicle 106 may determine the characteristic and/or the measurement of the storage compartment of autonomous vehicle 106 based on an image of the storage compartment of autonomous vehicle 106 and/or sensor data associated with the storage compartment of autonomous vehicle 106. In some non-limiting embodiments, autonomous vehicle 106 may determine the characteristic and/or the measurement of the storage compartment of autonomous vehicle 106 using a machine learning algorithm. For example, autonomous vehicle 106 may determine the characteristic and/or the measurement of the storage compartment of autonomous vehicle 106 using the machine learning algorithm on the image of the storage compartment of autonomous vehicle 106 and/or the sensor data associated with the storage compartment of autonomous vehicle 106.

Figure 6A:
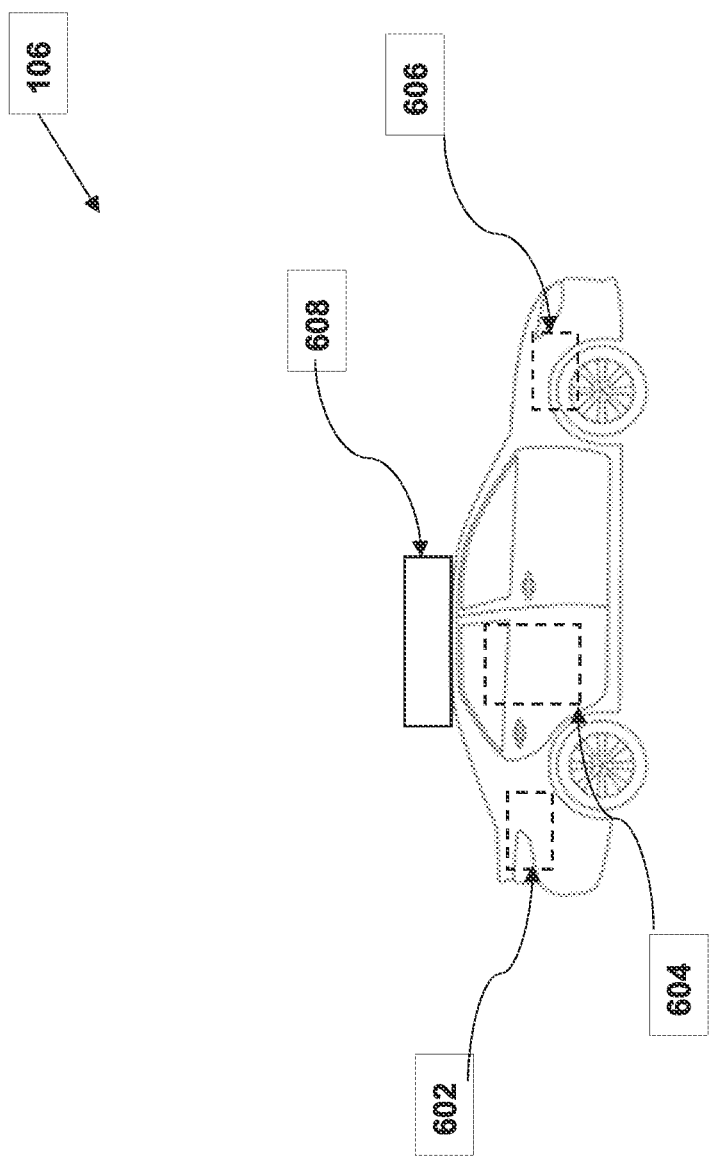
FIGS. 6A-6C are illustrations of storage compartments of an autonomous vehicle.
Figure 6B:
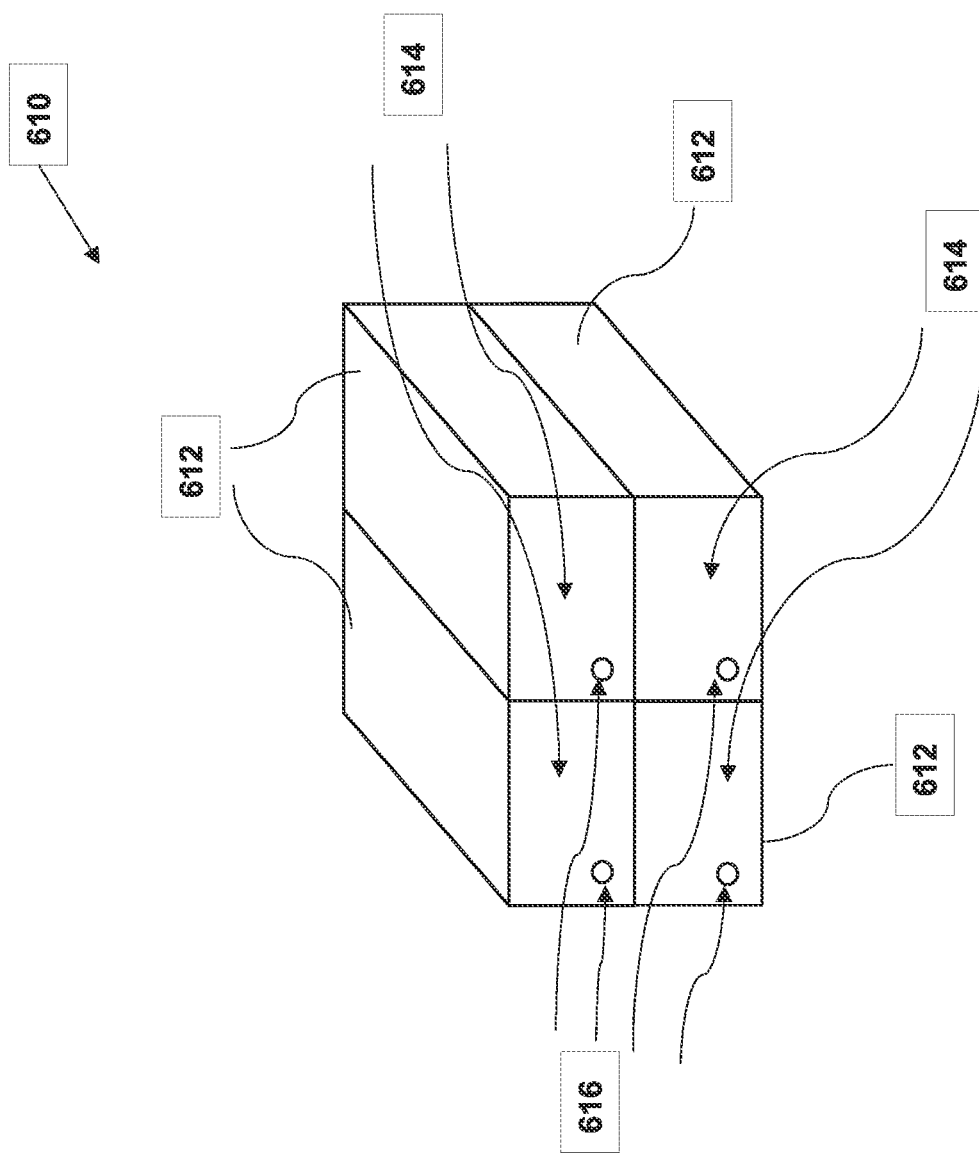

As shown in FIG. 6A, autonomous vehicle 106 may include a plurality of storage compartments, such as trunk 602, passenger storage compartment 604, frunk 606, and exterior storage compartment 608. As shown in FIG. 6B, storage compartment 610 may include a plurality of lockable storage containers 612 (e.g., a plurality of storage compartments, each of which are configured to be locked or unlocked via a locking mechanism). As further shown in FIG. 6B, each of the plurality of lockable storage containers 612 may be accessed via door 614 and may be individually or simultaneously locked or unlocked via locking mechanism 616 on door 614. In some non-limiting embodiments, one or more of the plurality of lockable storage containers 612 may be removable and replaceable within a storage compartment of autonomous vehicle 106.

Figure 6C:
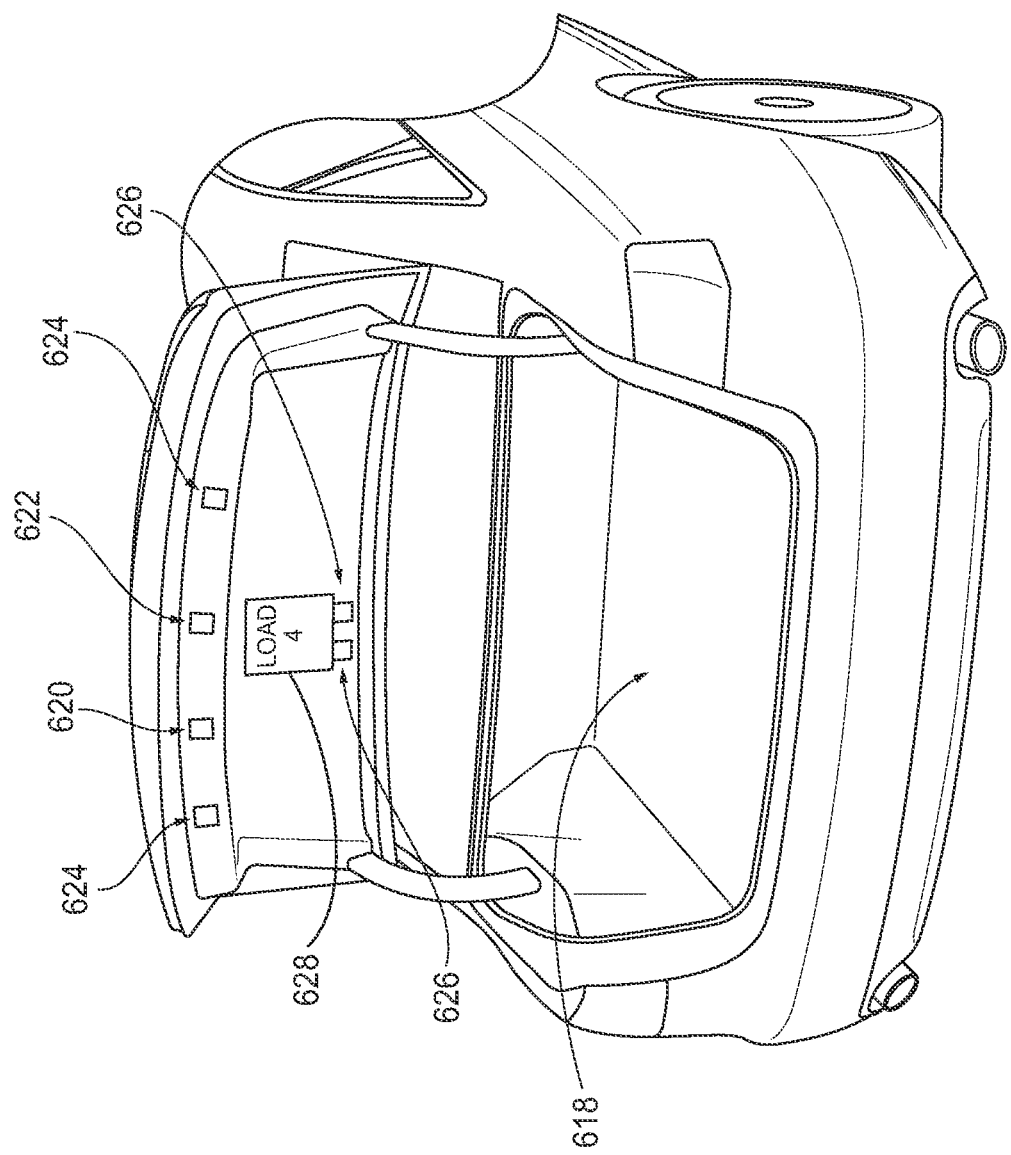

As shown in FIG. 6C, trunk 618 of autonomous vehicle 106 may include a LiDAR sensor 620. LiDAR sensor 620 may be used to scan trunk 618 to ensure that items that are positioned in (e.g., loaded) trunk 618 match prior agreements, to determine how much of the storage capacity (e.g., trunk space) is being consumed by the items, and/or to determine if it will be necessary to update a future pickup for a passenger because of insufficient storage capacity. LiDAR sensor 620 may also be used to determine whether closing a trunk lid of trunk 618 will damage the items positioned in trunk 618, such as higher-level cargo. As further shown in FIG. 6C, trunk 618 of autonomous vehicle 106 may include RFID sensor 622 and barcode readers 624. In some non-limiting embodiments, RFID sensor 622 may be used to read RFID tags of items (e.g., baggage). In some non-limiting embodiments, barcode readers 624 may be used to read barcodes on the items. In some non-limiting embodiments, barcode readers 624 may be replaced with one or more image capture devices for capturing images of trunk 618. In some non-limiting embodiments, barcode readers 624 and one or more image capture devices for capturing images of trunk 618 may present. As further shown in FIG. 6C, trunk 618 of autonomous vehicle 106 may include speakers 626 and display screen 628. In some non-limiting embodiments, speakers 626 and/or display screen 628 may be used to provide audio and/or visual feedback (e.g., a prompt, a hint, a suggestion, an indication, etc.) to the user as the user is loading items into trunk 618. For example, speakers 626 may be used to provide an audio prompt to the user to scan an item via a sensor, such as LiDAR sensor 620, RFID sensor 622, barcode readers 624, and/or the like. In such an example, display screen 628 may be used to provide a visual prompt to the user to scan the item via a sensor, such as LiDAR sensor 620, RFID sensor 622, barcode readers 624, and/or the like. Additionally or alternatively, display screen 628 may be used to provide a visual indication to the user regarding data associated with the item that has been scanned via the sensor.

As shown in FIG. 5, at step 504, process 500 includes determining that an autonomous vehicle has a storage compartment for storage of the item. For example, autonomous vehicle management system 102 may determine that autonomous vehicle 106 has a storage compartment for storage of the item. In some non-limiting embodiments, autonomous vehicle management system 102 may determine whether autonomous vehicle 106 has a storage compartment for storage of the item based on determining whether a storage compartment of a plurality of storage compartments of autonomous vehicle 106 is available (e.g., empty, unoccupied with an item, not currently storing an item, has sufficient storage capacity for storage of the item, etc.). For example, if autonomous vehicle management system 102 determines that a storage compartment of the plurality of storage compartments of autonomous vehicle 106 is available, then autonomous vehicle management system 102 may determine that autonomous vehicle 106 has a storage compartment for storage of the item. If autonomous vehicle management system 102 determines that a storage compartment of the plurality of storage compartments of autonomous vehicle 106 is not available, then autonomous vehicle management system 102 may determine that autonomous vehicle 106 does not have a storage compartment for storage of the item.

In some non-limiting embodiments, autonomous vehicle management system 102 may determine that autonomous vehicle 106 has a storage compartment with storage capacity for storage of the item (e.g., storage capacity that can accommodate a size and configuration of the item). For example, autonomous vehicle management system 102 may determine that autonomous vehicle 106 has a storage compartment with storage capacity for storage of the item based on data associated with the item and data associated with one or more storage compartments of autonomous vehicle 106. In such an example, autonomous vehicle management system 102 may receive (e.g., retrieve, obtain, etc.) the data associated with the item and the data associated with the one or more storage compartments of autonomous vehicle 106. Autonomous vehicle management system 102 may compare the data associated with the item to the data associated with the one or more storage compartments of autonomous vehicle 106 and determine if the data associated with the item corresponds to the data associated with the one or more storage compartments of autonomous vehicle 106. If autonomous vehicle management system 102 determines that the data associated with the item corresponds to the data associated with the one or more storage compartments of autonomous vehicle 106, autonomous vehicle management system 102 may determine that that autonomous vehicle 106 has a storage compartment with storage capacity for storage of the item. In some non-limiting embodiments, if autonomous vehicle management system 102 determines that the data associated with the item does not correspond to the data associated with the one or more storage compartments of autonomous vehicle 106, autonomous vehicle management system 102 may determine that autonomous vehicle 106 does not have a storage compartment with storage capacity for storage of the item. In some non-limiting embodiments, the data associated with the one or more storage compartments of autonomous vehicle 106 may include one or more rules (e.g., one or more thresholds) regarding a characteristic (e.g., a rule regarding dimensions, a rule regarding structure, a rule regarding quantity, a rule regarding temperature, a rule regarding substance, etc.) of an item to be positioned in the one or more storage compartments and/or one or more rules regarding a measurement of storage capacity of the one or more storage compartments of autonomous vehicle 106. In some non-limiting embodiments, autonomous vehicle management system 102 may store the data associated with the one or more storage compartments of autonomous vehicle 106 in a data structure. For example, autonomous vehicle management system 102 may store the data associated with the one or more storage compartments of autonomous vehicle 106 in a data structure in a memory of autonomous vehicle 106, in a memory of user device 104, and/or in a memory of autonomous vehicle management system 102.

In some non-limiting embodiments, autonomous vehicle management system 102 may determine whether the data associated with the item corresponds to the data associated with the one or more storage compartments of autonomous vehicle 106 by comparing one or more characteristics and/or one or more measurements of the item to one or more rules regarding a characteristic of an item to be positioned in the one or more storage compartments and/or one or more rules regarding a measurement of storage capacity of the one or more storage compartments. If autonomous vehicle management system 102 determines that the one or more characteristics and/or one or more measurements of the item satisfies the one or more rules regarding the characteristic of an item to be positioned in the one or more storage compartments and/or the one or more rules regarding the measurement of storage capacity of the one or more storage compartments, autonomous vehicle management system 102 may determine that the data associated with the item corresponds to the data associated with the one or more storage compartments of autonomous vehicle 106. If autonomous vehicle management system 102 determines that the one or more characteristics and/or one or more measurements of the item does not satisfy the one or more rules regarding the characteristic of an item to be positioned in the one or more storage compartments and/or the one or more rules regarding the measurement of storage capacity of the one or more storage compartments, autonomous vehicle management system 102 may determine that the data associated with the item does not correspond to the data associated with the one or more storage compartments of autonomous vehicle 106.

In some non-limiting embodiments, autonomous vehicle management system 102 may determine a status associated with the one or more storage compartments of autonomous vehicle 106. For example, autonomous vehicle management system 102 may determine whether the one or more storage compartments of autonomous vehicle 106 have storage capacity. In some non-limiting embodiments, autonomous vehicle management system 102 may determine whether the one or more storage compartments of autonomous vehicle 106 have an amount (e.g., a volume) of storage capacity. In some non-limiting embodiments, autonomous vehicle management system 102 may determine which of a plurality of storage compartments (e.g., some storage compartments, all storage compartments, etc.) of autonomous vehicle 106 have storage capacity. In some non-limiting embodiments, autonomous vehicle management system 102 may determine which of a plurality of storage containers, which are removable and replaceable within autonomous vehicle 106, have storage capacity. In some non-limiting embodiments, autonomous vehicle management system 102 may determine that autonomous vehicle 106 has a storage compartment with storage capacity for storage of the item based on determining the status associated with one or more storage compartments of autonomous vehicle 106.

In some non-limiting embodiments, autonomous vehicle management system 102 may determine the status associated with the one or more storage compartments of autonomous vehicle 106 each time a passenger interacts with autonomous vehicle 106. For example, autonomous vehicle management system 102 may determine the status associated with the one or more storage compartments of autonomous vehicle 106 each time a passenger embarks on and/or each time a passenger disembarks from autonomous vehicle 106.

In some non-limiting embodiments, autonomous vehicle management system 102 may receive an indication of status associated with the one or more storage compartments of autonomous vehicle 106. For example, autonomous vehicle management system 102 may receive the indication of status associated with the one or more storage compartments of autonomous vehicle 106 from user device 104. In some non-limiting embodiments, the user of user device 104 may provide a user input to a user interface of user device 104, where the user input is associated with the indication of status associated with the one or more storage compartments of autonomous vehicle 106 and user device 104 may transmit the indication of status to autonomous vehicle management system 102 based on user device 104 receiving the user input. Autonomous vehicle management system 102 may receive the indication of status based on user device 104 transmitting the indication of status. In some non-limiting embodiments, the indication of status may include indication of a condition associated with the one or more storage compartments of autonomous vehicle 106. In some non-limiting embodiments, the indication of status may include an indication that there is a problem with the one or more storage compartments of autonomous vehicle 106, such as a foreign substance (e.g., an undesirable substance, such as a liquid, an amount of dirt, etc.) being present in the one or more storage compartments of autonomous vehicle 106, damage being present on the one or more storage compartments of autonomous vehicle 106, such as a hole or tear in the one or more storage compartments, a broken closure mechanism (e.g., a latch mechanism) of the one or more storage compartments, and/or the like, a lack of available space in the one or more storage compartments of autonomous vehicle 106, a presence of an unknown item, and/or the like.

In some non-limiting embodiments, autonomous vehicle management system 102 may receive an indication of status associated with the one or more storage compartments of autonomous vehicle 106 from an image capture device and/or a sensor. For example, autonomous vehicle management system 102 may receive the indication of status from an image capture device and/or a sensor of autonomous vehicle 106.

In some non-limiting embodiments, the user of user device 104 may place the item in a storage compartment of autonomous vehicle 106. For example, the user of user device 104 may place the item in the storage compartment of autonomous vehicle 106 after receiving, by user device 104, an indication that autonomous vehicle 106 has a storage compartment with storage capacity for storage of the item. In some non-limiting embodiments, autonomous vehicle management system 102 may determine that the item has been positioned in a storage compartment of autonomous vehicle 106. For example, autonomous vehicle management system 102 may determine that the item has been positioned in the storage compartment based on image data associated with an image of the storage compartment (e.g., an image of the item positioned in the storage compartment) and/or sensor data associated with the storage compartment (e.g., sensor data indicating that the item has been positioned in the storage compartment). In some non-limiting embodiments, autonomous vehicle 106 may travel on a route (e.g., to initiate travel on a route, to continue to travel on a route, etc.) based on the item having been positioned in the storage compartment. For example, autonomous vehicle management system 102 may cause autonomous vehicle 106 to travel on the route based on autonomous vehicle management system 102 determining that the item has been positioned in the storage compartment. In some non-limiting embodiments, autonomous vehicle management system 102 may determine that the item has not been positioned in a storage compartment of autonomous vehicle 106. For example, autonomous vehicle management system 102 may determine that the item has not been positioned in the storage compartment based on image data associated with an image of the storage compartment (e.g., an image of the storage compartment without the item positioned therein) and/or sensor data associated with the storage compartment (e.g., sensor data indicating that the item has not been positioned in the storage compartment). In some non-limiting embodiments, autonomous vehicle 106 may forego travelling on a route (e.g., forego initiating travel on a route, forego continuing to travel on a route, etc.) based on the item having not been positioned in the storage compartment. For example, autonomous vehicle management system 102 may cause autonomous vehicle 106 to forego travelling on the route based on autonomous vehicle management system 102 determining that the item has not been positioned in the storage compartment.

In some non-limiting embodiments, autonomous vehicle management system 102 may cause a storage compartment of autonomous vehicle 106 to lock. For example, autonomous vehicle management system 102 may determine that the item has been positioned in the storage compartment based on image data associated with an image of the storage compartment and/or sensor data associated with the storage compartment. Autonomous vehicle management system 102 may cause the storage compartment of autonomous vehicle 106 to lock based on determining that the item has been positioned in the storage compartment.

Figure 7:
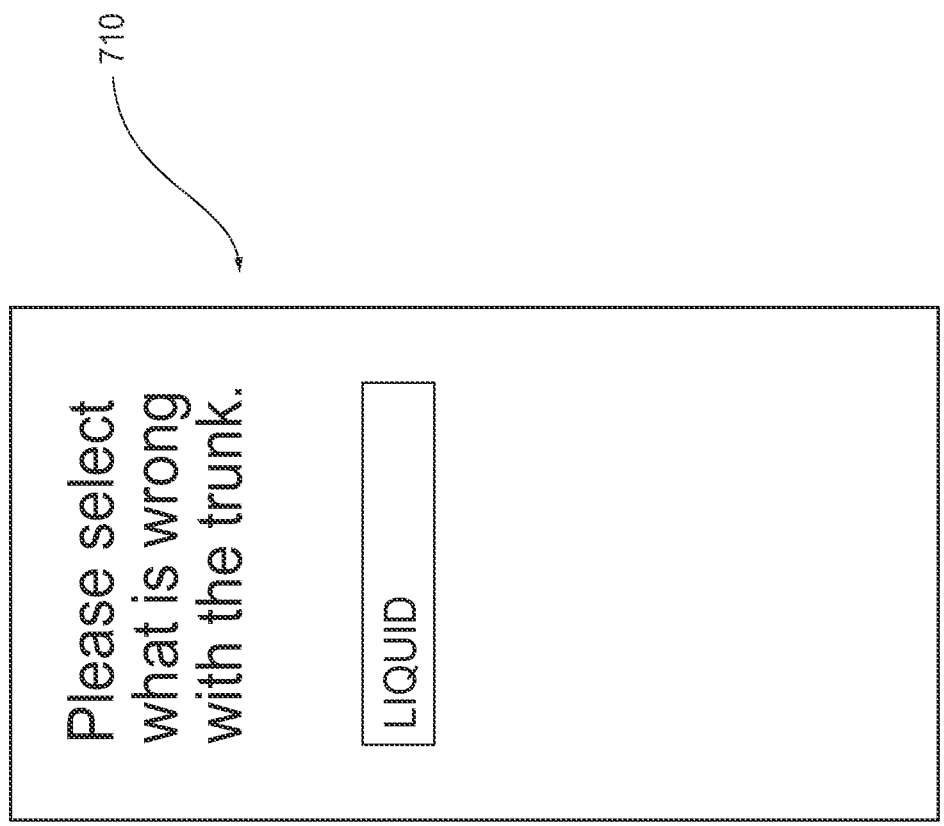
FIG. 7 is an illustration of a user interface for providing an indication of a condition associated with the one or more storage compartments of an autonomous vehicle.

As shown in FIG. 7, user device 104 may provide GUI 710, with which the user of user device 104 may provide a user input that is associated with an indication of status associated with the one or more storage compartments of autonomous vehicle 106.

Figure 8:
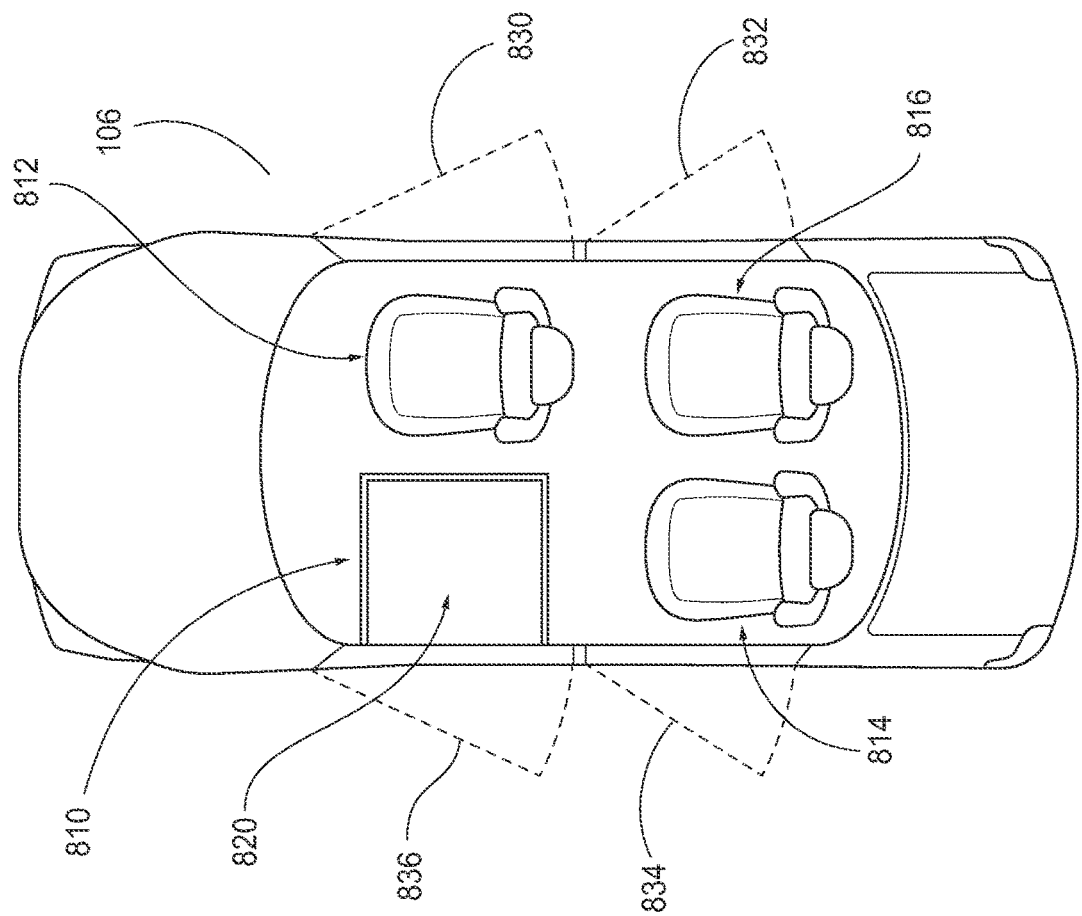
FIG. 8 is a diagram of an interior of an autonomous vehicle.

As shown in FIG. 8, an interior (e.g., a passenger compartment) of autonomous vehicle 106 may include partition 810. As further shown in FIG. 8, partition 810 may turn a space of one seat of the interior of autonomous vehicle 106 into storage compartment 820, leaving seats 812, 814, 816 as seating capacity for passengers. Each of doors 830, 832, 834, 836 of autonomous vehicle 106 can independently be locked, and in this way, passengers sitting in seats 812, 814, 816 may be prevented from accessing an item positioned in storage compartment 820. In some non-limiting embodiments, the user may have exclusive access to storage compartment 820, which may be controlled by locking and unlocking door 836.

As shown in FIG. 5, at step 506, process 500 includes providing an indication of a seating position. For example, autonomous vehicle management system 102 may provide the indication of a seating position for the user of user device 104 within autonomous vehicle 106. The indication of a seating position for the user of user device 104 within autonomous vehicle 106 may provide an indication of where the user is supposed to sit within (e.g., in a seat inside of a passenger compartment of) autonomous vehicle 106. In some non-limiting embodiments, the indication of the seating position for the user may be an indication of a reserved seating for the user. For example, the indication of the seating position for the user may be an indication of a reserved seating for the user within autonomous vehicle 106 so that other passengers of autonomous vehicle 106 are made aware so that the other passengers do not attempt to sit in a seat reserved for the user. In some non-limiting embodiments, autonomous vehicle management system 102 may provide the indication of a seating position for the user of user device 104 within autonomous vehicle 106 based on determining that autonomous vehicle 106 has a storage compartment with storage capacity for storage of the item and/or based on determining that autonomous vehicle 106 has a passenger compartment with passenger capacity for the user.

In some non-limiting embodiments, autonomous vehicle management system 102 may provide the indication of the seating position for the user prior to the user embarking on autonomous vehicle 106. For example, autonomous vehicle management system 102 may provide the indication of the seating position for the user prior to the user getting into autonomous vehicle 106, prior to autonomous vehicle 106 arriving at a location for picking up the user, during a time when autonomous vehicle 106 is traveling to a location for picking up the user, and/or the like. In some non-limiting embodiments, the indication of the seating position for the user may include an indication of a seating position of a plurality of seating positions in a passenger compartment of autonomous vehicle 106 for the user. In some non-limiting embodiments, the indication of the seating position for the user may include an indication of a number of locations at which autonomous vehicle 106 will stop and/or an indication of an amount of time it will take for autonomous vehicle 106 to arrive at a location for picking up the user.

In some non-limiting embodiments, autonomous vehicle management system 102 may cause the indication of a seating position for the user to be displayed on user device 104. For example, autonomous vehicle management system 102 may cause a user interface (e.g., a graphical user interface (GUI) of a mobile application on user device 104) to display the indication of a seating position for the user on user device 104 (e.g., user device 104 of the user, user device 104 of another passenger of autonomous vehicle 106, etc.). In some non-limiting embodiments, autonomous vehicle management system 102 may cause the indication of a seating position for the user to be displayed within autonomous vehicle 106 in an interior (e.g., a passenger compartment) of autonomous vehicle 106. For example, autonomous vehicle management system 102 may cause a user interface (e.g., a GUI of an application) to display the indication of a seating position for the user on one or more display screens (e.g., a display screen on a back of seat, a ceiling, a door, a window, and/or the like, a heads-up display, etc.) of autonomous vehicle 106.

In some non-limiting embodiments, autonomous vehicle management system 102 may cause an indication of ingress into autonomous vehicle 106 to be displayed and/or provided by autonomous vehicle 106. For example, autonomous vehicle management system 102 may cause an indication of ingress into autonomous vehicle 106 to be displayed and/or provided by autonomous vehicle 106 based on determining that autonomous vehicle 106 has arrived at a location for picking up the user of user device 104. In some non-limiting embodiments, autonomous vehicle management system 102 may determine that autonomous vehicle 106 has arrived at the location for picking up the user of user device 104 based on a location (e.g., a GPS location) of autonomous vehicle 106. Additionally or alternatively, autonomous vehicle management system 102 may determine that autonomous vehicle 106 has arrived at the location for pickup of the user of user device 104 based on receiving a message from user device 104 that indicates that autonomous vehicle 106 has arrived at the location for picking up the user of user device 104. In some non-limiting embodiments, the indication of ingress into autonomous vehicle 106 may include the illumination (e.g., consistent illumination, pulsating illumination, predetermined pattern of illumination, etc.) of a light source (e.g., a light bulb, a string of light bulbs, a light emitting diode (LED), a plurality of LEDs, etc.) on autonomous vehicle 106. In some non-limiting embodiments, the indication of ingress into autonomous vehicle 106 may include the illumination of a light source on a single point of ingress (e.g., a single door) of autonomous vehicle 106. In some non-limiting embodiments, the indication of ingress into autonomous vehicle 106 may include the illumination of a plurality of light sources of autonomous vehicle 106, where the illumination of a light source associated with the appropriate point of ingress (e.g., an appropriate door) is unique from the illumination of one or more other light sources associated with other inappropriate points of ingress.

In some non-limiting embodiments, autonomous vehicle management system 102 may provide a first indication of a seating position for the user within autonomous vehicle 106, cause an indication of ingress into autonomous vehicle 106 to be displayed by autonomous vehicle 106, and provide a second indication of the seating position for the user within autonomous vehicle 106. For example, autonomous vehicle management system 102 may provide an indication of a reserved seating position for the user within autonomous vehicle 106 in an interior (e.g., a passenger compartment) of the autonomous vehicle and autonomous vehicle management system 102 may cause the indication of ingress into autonomous vehicle 106 to be displayed by autonomous vehicle 106 after providing the indication of the reserved seating position for the user. Autonomous vehicle management system 102 may provide an indication of the seating position for the user within autonomous vehicle 106 to user device 104 (e.g., only to user device 104 via a mobile application of user device 104 such that only the user of user device 104 may view the indication of the seating position for the user within autonomous vehicle 106).

Figure 9A:
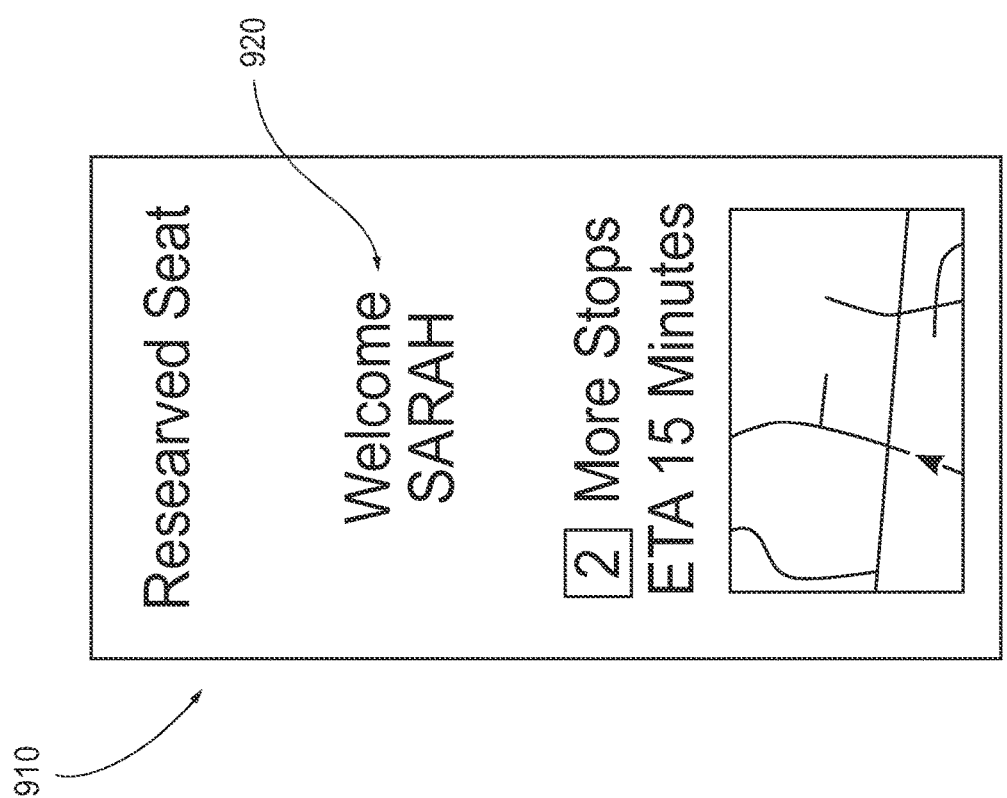
FIGS. 9A and 9B are illustrations of a user interface for providing an indication of a seating position and a location of a display screen in an autonomous vehicle.
Figure 9B:
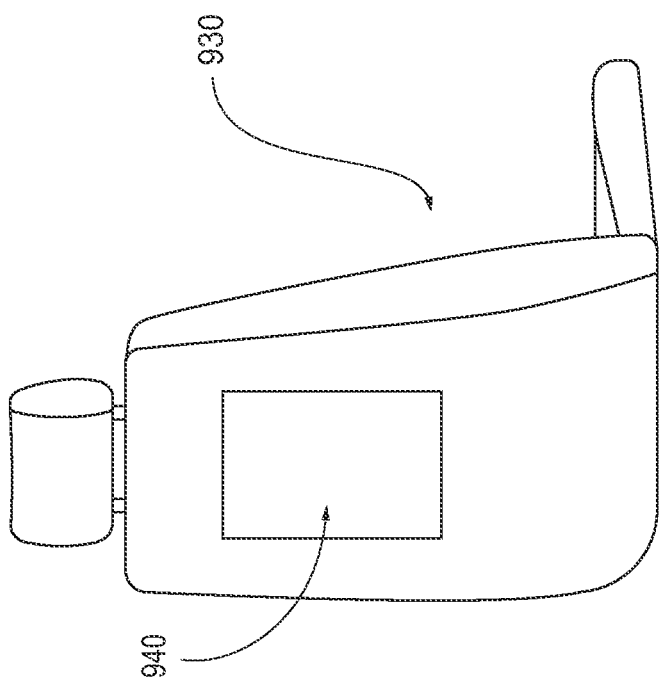

As shown in FIG. 9A, autonomous vehicle management system 102 may cause GUI 910 of an application to display message 920 that includes the indication of a seating position for the user of user device 104 within autonomous vehicle 106. As shown in FIG. 9B, seat 930 of autonomous vehicle 106 may include display screen 940, on which the indication of a reserved seating position for the user may be displayed in an interior of autonomous vehicle 106. In some non-limiting embodiments, each seat 930 of autonomous vehicle 106 may include display screen 940. In some non-limiting embodiments, each display screen 940 of each seat 930 of autonomous vehicle 106 may have a specific (e.g., personalized, customized, etc.) GUI 910 displayed on display screen 940 that is based on the user's name, image, and/or other privacy-preserving information to reinforce in which seating position the user is supposed to sit. In some non-limiting embodiments, GUI 910 may be displayed based on preferences of a user's profile for a service (e.g., a ridesharing service, a delivery service, etc.). In some non-limiting embodiments, display screen 940 may display other information or a message, such as "[user name], sitting in the back is safest." In some non-limiting embodiments, where autonomous vehicle 106 is about to pick up a new passenger, display screen 940 can provide information associated with the new passenger on GUI 910 displayed on display screen 940 so the other passengers may feel more comfortable that the expected passenger is being picked up by autonomous vehicle 106. GUI 910 may also be provided to user device 104, so the user of user device 104 can discreetly view information on user device 104. In some non-limiting embodiments, display screen 940 may display a storage compartment of autonomous vehicle 106. For example, display screen 940 may display the storage compartment of autonomous vehicle 106 when a passenger is loading an item into or unloading an item from the storage compartment.

Figure 10:
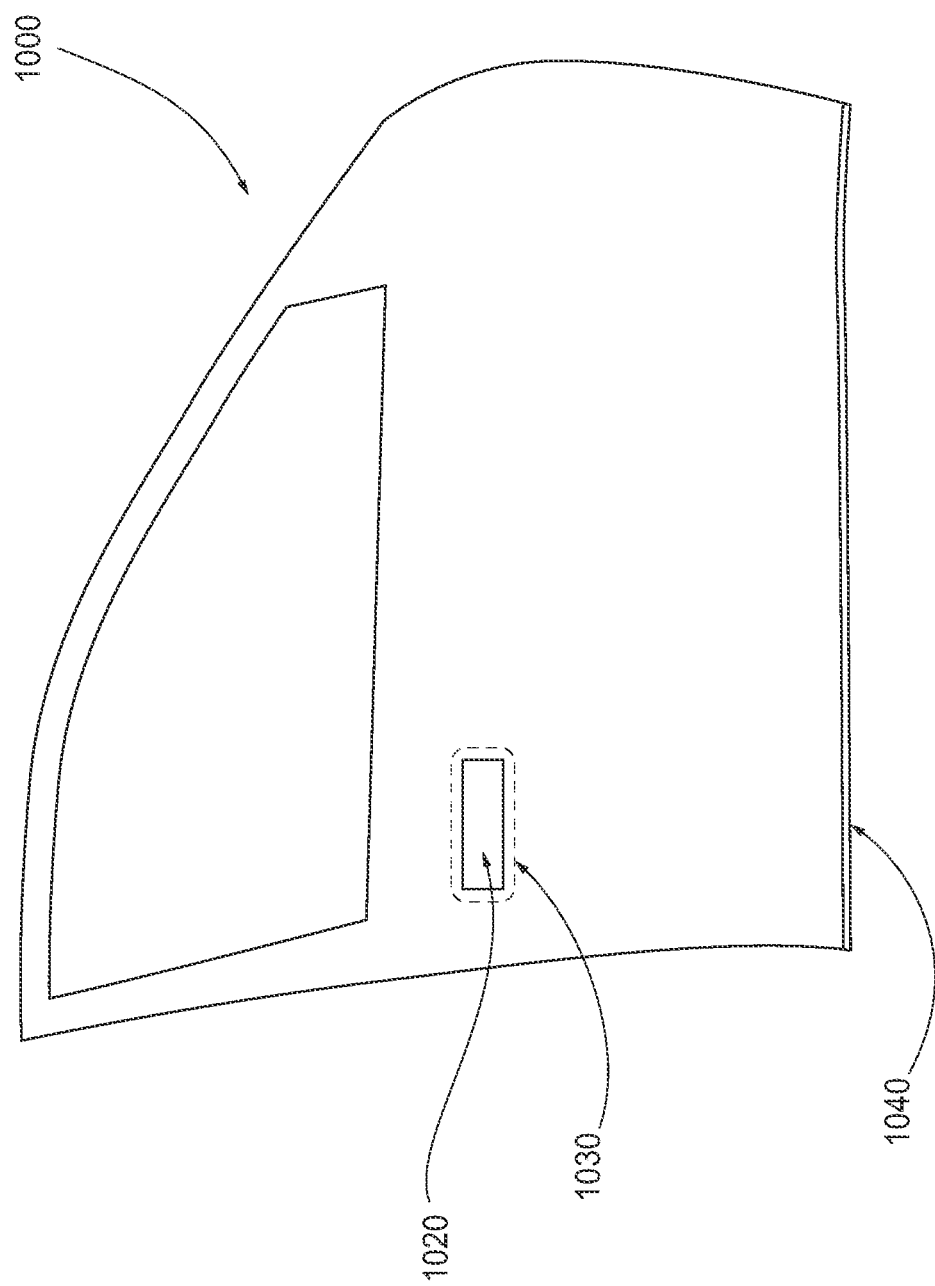
FIG. 10 is a door of an autonomous vehicle.

As shown in FIG. 10, door 1000 of autonomous vehicle 106 may include a plurality of light sources 1030, 1040 that provide an indication of ingress into autonomous vehicle 106. As further shown in FIG. 10, light source 1030 may be located around door handle 1020 of door 1000 and light source 1040 may be positioned on a bottom edge of door 1000. In some non-limiting embodiments, light source 1030 may provide a specific color of light to encourage or discourage ingress into autonomous vehicle 106. For example, light source 1030 may provide a green color of light to encourage ingress by a passenger via door 1000 and light source 1030 may provide a red color of light to discourage ingress by a passenger via door 1000. In some non-limiting embodiments, light source 1040 may provide white light to illuminate an environment around door 1000 and/or an environment around autonomous vehicle 106. In some non-limiting embodiments, if the user is reaching for door 1000 of autonomous vehicle 106 that is inappropriate for ingress for the user, light source 1030 around door handle 1020 may provide a color of light discouraging ingress (e.g., may provide a red color of light) and an internal lock/unlock button may also provide a color of light discouraging ingress. In some non-limiting embodiments, light source 1030 may not be activated unless autonomous vehicle management system 102 determines that a light provided by light source 1030 may be visible to the user, to avoid confusion from other nearby people mistaking autonomous vehicle 106 for another autonomous vehicle providing a service (e.g., a ridesharing service). Autonomous vehicle management system 102 may be able to determine where the user is relative to autonomous vehicle 106 and to determine (e.g., via a simple model) what the user may be capable of viewing based on a position of the user and/or the intent of the user based on movement by the user, and to discourage movement by the user in an incorrect direction. In some non-limiting embodiments, autonomous vehicle management system 102 may cause door 1000 of autonomous vehicle 106 to open to encourage the user to enter autonomous vehicle 106.

In some non-limiting embodiments, if the user is approaching door 1000, and door 1000 is appropriate for ingress by the user, an audio source (e.g., a speaker) may provide an audio prompt to the user to indicate that the user should use door 1000 to enter into autonomous vehicle 106. In some non-limiting embodiments, if the user is approaching a door other than door 1000, and door 1000 is appropriate for ingress by the user, an audio source (e.g., a speaker) may provide an audio prompt to the user to indicate that the user should instead use door 1000 to enter into autonomous vehicle 106. In some non-limiting embodiments, audio information provided by an audio source of autonomous vehicle 106 will be in a preferred language of the user.

Figure 11:
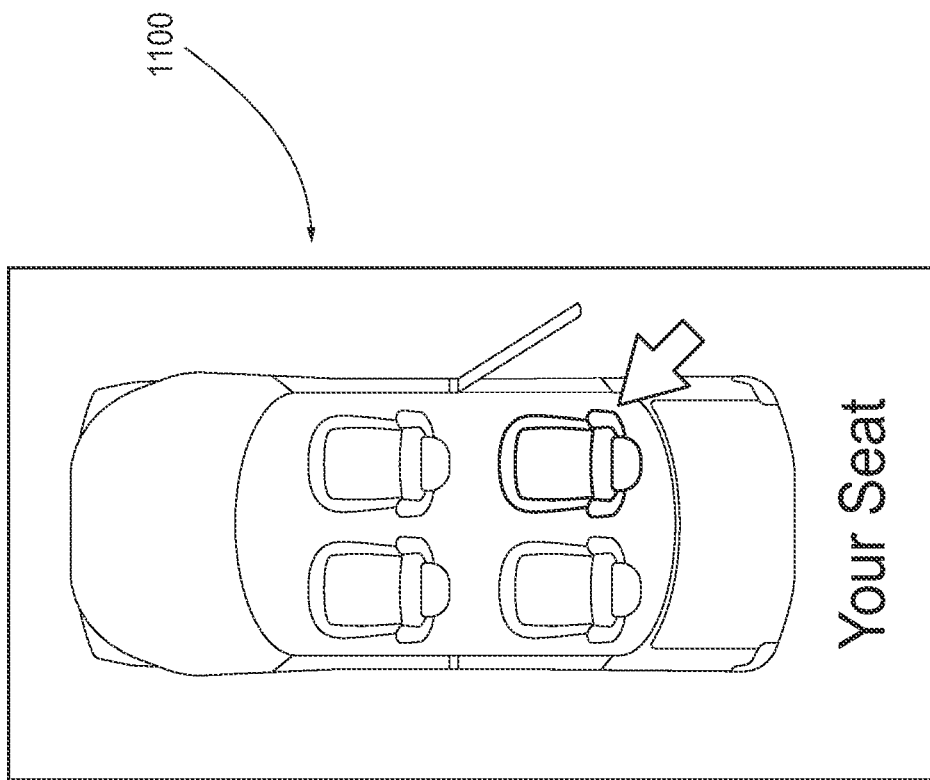
FIG. 11 is an illustration of an interior of an autonomous vehicle with partitions.

As shown in FIG. 11, autonomous vehicle management system 102 may cause GUI 1100 of a mobile application on user device 104 to display the indication of a seating position for the user of user device 104 within autonomous vehicle

106. As shown in FIG. 11, GUI 1100 may display a specified seating position for the user among a plurality of seating positions within autonomous vehicle 106. In some non-limiting embodiments, the indication of a seating position for the user may include a haptic indication, an audio indication (e.g., a speech indication), and/or a visual indication (e.g., a video indication). In some non-limiting embodiments, an audio indication and/or a visual indication may be based upon data associated with autonomous vehicle 106 and/or data associated with an environment of autonomous vehicle 106. For example, the audio indication and/or the visual indication may be based upon an image of autonomous vehicle 106, an image of the environment of autonomous vehicle 106, and/or data associated with one or more sensors of autonomous vehicle 106.

As shown in FIG. 5, at step 508, process 500 includes determining whether the item has been removed from the storage compartment of the autonomous vehicle. For example, autonomous vehicle management system 102 may determine whether the item has been removed from the storage compartment of autonomous vehicle 106. In some non-limiting embodiments, autonomous vehicle management system 102 may determine whether the item has been removed from the storage compartment of autonomous vehicle 106 after autonomous vehicle 106 arrives at a destination location. For example, autonomous vehicle management system 102 may determine whether the item has been removed from the storage compartment of autonomous vehicle 106 based on determining that autonomous vehicle 106 has arrived at the destination location. In some non-limiting embodiments, autonomous vehicle management system 102 may determine whether the item has been removed from the storage compartment of autonomous vehicle 106 based on expiration of a time interval (e.g., a predetermined time interval, a time interval determined in real-time, a time interval determined according to contextual activities associated with autonomous vehicle 106, etc.) after a time at which autonomous vehicle 106 arrived at the destination location. In some non-limiting embodiments, autonomous vehicle management system 102 may determine whether the item has been removed from the storage compartment of autonomous vehicle 106 based on receiving an indication, from user device 104, that the user of user device 104 has disembarked from autonomous vehicle 106 (e.g., after autonomous vehicle 106 has arrived at the destination location).

In some non-limiting embodiments, autonomous vehicle management system 102 may determine whether the item has been removed from the storage compartment based on image data associated with an image of the storage compartment (e.g., an image of the item positioned in the storage compartment or an image showing that the item has been removed from the storage compartment) and/or sensor data associated with the storage compartment (e.g., sensor data indicating that the item are positioned in the storage compartment or sensor data indicating that the item has been removed the storage compartment).

In some non-limiting embodiments, autonomous vehicle management system 102 may cause a storage compartment of autonomous vehicle 106 to unlock. For example, autonomous vehicle management system 102 may determine that autonomous vehicle 106 has arrived at a destination location of the user. Autonomous vehicle management system 102 may cause the storage compartment of autonomous vehicle 106 to unlock based on determining that autonomous vehicle 106 has arrived at the destination location of the user. In some non-limiting embodiments, autonomous vehicle management system 102 may determine whether the item has been removed from the storage compartment based on autonomous vehicle management system 102 causing the storage compartment of autonomous vehicle 106 to unlock. For example, autonomous vehicle management system 102 may determine whether the item has been removed from the storage compartment based on the expiration of a predetermined time interval after autonomous vehicle management system 102 caused the storage compartment of autonomous vehicle 106 to unlock.

As shown in FIG. 5, at step 510 ("YES"), process 500 includes foregoing transmitting a notification to a user device. For example, autonomous vehicle management system 102 may forego transmitting a notification that the item has not been removed from the storage compartment to user device 104 based on determining that the item has been removed from the storage compartment.

In some non-limiting embodiments, the user of user device 104 may remove the item from a storage compartment of autonomous vehicle 106. For example, the user of user device 104 may remove the item from the storage compartment of autonomous vehicle 106 after receiving, by user device 104, an indication that autonomous vehicle 106 has arrived at a destination location of the user.

In some non-limiting embodiments, autonomous vehicle management system 102 may determine that the item has been removed from the storage compartment of autonomous vehicle 106. For example, autonomous vehicle management system 102 may determine that the item has been removed from the storage compartment based on image data associated with an image of the storage compartment (e.g., an image showing that the item has been removed from the storage compartment) and/or sensor data associated with the storage compartment (e.g., sensor data indicating that the item has been removed from the storage compartment). In some non-limiting embodiments, autonomous vehicle 106 may travel on a route (e.g., to initiate travel on a route, to continue to travel on a route, etc.) based on the item having been removed from the storage compartment. For example, autonomous vehicle management system 102 may cause autonomous vehicle 106 to travel on the route based on autonomous vehicle management system 102 determining that the item has been removed from the storage compartment.

As shown in FIG. 5, at step 512 ("NO"), process 500 includes transmitting a notification to a user device. For example, autonomous vehicle management system 102 may transmit a notification that the item has not been removed from the storage compartment to user device 104 based on determining that the item has not been removed from the storage compartment.

In some non-limiting embodiments, the user of user device 104 may fail to remove the item from a storage compartment of autonomous vehicle 106. For example, the user of user device 104 may fail to remove the item from the storage compartment of autonomous vehicle 106 after receiving, by user device 104, an indication that autonomous vehicle 106 has arrived at a destination location of the user.

In some non-limiting embodiments, autonomous vehicle management system 102 may determine that the item has not been removed from the storage compartment of autonomous vehicle 106. For example, autonomous vehicle management system 102 may determine that the item has not been removed from the storage compartment based on image data associated with an image of the storage compartment (e.g., an image of the storage compartment with the item positioned in the storage compartment) and/or sensor data associated with the storage compartment (e.g., sensor data indicating that the item has not been removed from the storage compartment). In some non-limiting embodiments, autonomous vehicle 106 may forego travelling on a route (e.g., forego initiating travel on a route, forego continuing to travel on a route, etc.) based on the item having not been removed from the storage compartment. For example, autonomous vehicle management system 102 may cause autonomous vehicle 106 to forego travelling on the route based on autonomous vehicle management system 102 determining that the item has not been removed from the storage compartment.

Referring now to FIG. 12, FIG. 12 is a flowchart of non-limiting embodiments of a process 1200 for managing access to an autonomous vehicle. In some non-limiting embodiments, one or more of the steps of process 1200 may be performed (e.g., completely, partially, etc.) by autonomous vehicle management system 102 (e.g., one or more devices of autonomous vehicle management system 102, etc.). In some non-limiting embodiments, one or more of the steps of process 1200 may be performed (e.g., completely, partially, etc.) by another device or a group of devices separate from or including autonomous vehicle management system 102, such as user device 104 and/or autonomous vehicle 106 (e.g., system architecture 200, etc.).

As shown in FIG. 12, at step 1202, process 1200 includes receiving data associated with an item. In some non-limiting embodiments, autonomous vehicle management system 102 may receive the data associated with the item in a same or similar fashion as described herein with regard to step 502 of process 500.

As shown in FIG. 12, at step 1204, process 1200 includes determining that an autonomous vehicle has a storage compartment for storage of the item. For example, autonomous vehicle management system 102 may determine that autonomous vehicle 106 has a storage compartment for storage of the item. In some non-limiting embodiments, autonomous vehicle management system 102 may determine that autonomous vehicle 106 has a storage compartment for storage of the item as described herein with regard to step 504 of process 500

As shown in FIG. 12, at step 1206, process 1200 includes designating the storage compartment for storage of the item. For example, autonomous vehicle management system 102 may designate (e.g., assign) the storage compartment for storage of the item. In some non-limiting embodiments, autonomous vehicle management system 102 may designate a storage compartment of a plurality of storage compartments for storage of the item as a designated storage compartment. In some non-limiting embodiments, autonomous vehicle management system 102 may designate the storage compartment of the plurality of storage compartments for storage of the item as the designated storage compartment based on determining that the storage compartment has storage capacity for the item.

In some non-limiting embodiments, autonomous vehicle management system 102 may provide an indication of a position of the designated storage compartment of autonomous vehicle 106 to user device 104. For example, autonomous vehicle management system 102 may cause a user interface (e.g., a graphical user interface (GUI) of a mobile application on user device 104) to display the indication of the position of the designated storage compartment of autonomous vehicle 106 on user device 104 (e.g., user device 104 of the user, user device 104 of another passenger of autonomous vehicle 106, etc.). In some non-limiting embodiments, autonomous vehicle management system 102 may provide an identifier of the designated storage compartment of autonomous vehicle 106 to user device 104. For example, autonomous vehicle management system 102 may cause a user interface to display the identifier of the designated storage compartment of autonomous vehicle 106 on user device 104. In some non-limiting embodiments, autonomous vehicle management system 102 may designate the storage compartment for storage of the item by storing an identifier of the designated storage compartment of autonomous vehicle 106 with an identifier of the item (e.g., an identifier of user device 104, which was used by a user of user device 104 to submit a request for a service associated with autonomous vehicle 106) for storage, in a data structure.

As shown in FIG. 12, at step 1208, process 1200 includes causing the storage compartment to lock after the item is positioned in the storage compartment. For example, autonomous vehicle management system 102 may cause the designated storage compartment to lock after the item is positioned in the designated storage compartment.

In some non-limiting embodiments, autonomous vehicle management system 102 may cause a storage compartment (e.g., the designated storage compartment) of autonomous vehicle 106 to lock. In some non-limiting embodiments, autonomous vehicle management system 102 may cause the storage compartment of autonomous vehicle 106 to lock by activating the locking mechanism of the storage compartment to lock the storage compartment. For example, autonomous vehicle management system 102 may transmit a signal (e.g., a control signal) to the locking mechanism to activate the locking mechanism of the storage compartment to lock the storage compartment.

In some non-limiting embodiments, autonomous vehicle management system 102 may cause the storage compartment of autonomous vehicle 106 to lock after the item is positioned in the storage compartment. For example, autonomous vehicle management system 102 may determine that the item has been positioned in the storage compartment based on image data associated with an image of the storage compartment and/or sensor data associated with the storage compartment. Autonomous vehicle management system 102 may cause the storage compartment of autonomous vehicle 106 to lock based on determining that the item has been positioned in the storage compartment.

In some non-limiting embodiments, autonomous vehicle management system 102 may cause the storage compartment of autonomous vehicle 106 to lock based on a route of autonomous vehicle 106. For example, autonomous vehicle management system 102 may cause the storage compartment of autonomous vehicle 106 to lock based on autonomous vehicle 106 embarking on the route, autonomous vehicle 106 traveling (e.g., traveling at predetermined velocity, traveling at a threshold velocity, traveling along a predetermined section, such as a predetermined road, etc.) on the route, or arriving at a destination location (e.g., a predetermined destination location for delivery of an item) of the route.

In some non-limiting embodiments, autonomous vehicle management system 102 may cause the storage compartment of autonomous vehicle 106 to lock based on a presence of an individual (e.g., the user). For example, autonomous vehicle management system 102 may cause the storage compartment of autonomous vehicle 106 to lock based on determining that the individual is present (e.g., is within a predetermined distance of autonomous vehicle 106, is within sensor range of autonomous vehicle 106, is able to be detected based on an image, etc.). In some non-limiting embodiments, autonomous vehicle management system 102 may cause the storage compartment of autonomous vehicle 106 to lock based on receiving data associated with locking the storage compartment of autonomous vehicle 106. For example, autonomous vehicle management system 102 may cause the storage compartment of autonomous vehicle 106 to lock based on receiving a message (e.g., a message from user device 104) that includes data associated with locking the storage compartment of autonomous vehicle 106, such as a code for locking the storage compartment of autonomous vehicle 106, an identifier of the item (e.g., an identifier of the item that is stored in a data structure with an identifier of the designated storage compartment), and/or an identifier of the storage compartment (e.g., the designated storage compartment).

In some non-limiting embodiments, a user may lock the storage compartment of autonomous vehicle 106 via the locking mechanism of the storage compartment. For example, the user may use a key, a combination dial, a keypad, and/or the like, on the locking mechanism of the storage compartment to lock the storage compartment.

In some non-limiting embodiments, user device 104 may cause the storage compartment of autonomous vehicle 106 to lock. For example, user device 104 may transmit a signal to autonomous vehicle management system 102, autonomous vehicle 106, and/or the locking mechanism of the storage compartment to cause the storage compartment of autonomous vehicle 106 to unlock. In some non-limiting embodiments, user device 104 may transmit the signal to autonomous vehicle 106 and/or the locking mechanism of the storage compartment via a short-range communication connection (e.g., a Bluetooth connection, an RFID connection, a near-field communication (NFC) connection, etc.).

As shown in FIG. 12, at step 1210, process 1200 includes causing the storage compartment to unlock to allow removal of the item. For example, autonomous vehicle management system 102 may cause the designated storage compartment to lock after the item is positioned in the designated storage compartment.

In some non-limiting embodiments, autonomous vehicle management system 102 may cause a storage compartment (e.g., the designated storage compartment) of autonomous vehicle 106 to unlock. In some non-limiting embodiments, autonomous vehicle management system 102 may cause the storage compartment of autonomous vehicle 106 to unlock by activating the locking mechanism of the storage compartment to unlock the storage compartment. For example, autonomous vehicle management system 102 may transmit a signal (e.g., a control signal) to the locking mechanism to activate the locking mechanism of the storage compartment to unlock the storage compartment.

In some non-limiting embodiments, autonomous vehicle management system 102 may cause the storage compartment of autonomous vehicle 106 to unlock based on data associated with the item that is positioned in the storage compartment. For example, autonomous vehicle management system 102 may determine that the item is to be removed from the storage compartment based on data associated with the item. Autonomous vehicle management system 102 may cause the storage compartment of autonomous vehicle 106 to unlock based on determining that the item is to be removed from the storage compartment. In some non-limiting embodiments, autonomous vehicle management system 102 may determine that the item is to be removed from the storage compartment based on expiration of a predetermined time interval associated with an amount of time the item is to be positioned in the storage compartment.

In some non-limiting embodiments, autonomous vehicle management system 102 may cause the storage compartment of autonomous vehicle 106 to unlock based on a route of autonomous vehicle 106. For example, autonomous vehicle management system 102 may cause the storage compartment of autonomous vehicle 106 to unlock based on autonomous vehicle 106 arriving at a destination location (e.g., a predetermined destination location for delivery of an item) of the route. In some non-limiting embodiments, autonomous vehicle management system 102 may cause the storage compartment of autonomous vehicle 106 to unlock based on autonomous vehicle 106 arriving at a destination location and the expiration of a predetermined time interval.

In some non-limiting embodiments, autonomous vehicle management system 102 may cause the storage compartment of autonomous vehicle 106 to unlock based on a presence of an individual (e.g., the user). For example, autonomous vehicle management system 102 may cause the storage compartment of autonomous vehicle 106 to unlock based on determining that the individual is present (e.g., is within a predetermined distance of autonomous vehicle 106, is within sensor range of autonomous vehicle 106, is able to be detected based on an image, etc.). In some non-limiting embodiments, autonomous vehicle management system 102 may cause the storage compartment of autonomous vehicle 106 to unlock based on receiving data associated with unlocking the storage compartment of autonomous vehicle 106. For example, autonomous vehicle management system 102 may cause the storage compartment of autonomous vehicle 106 to unlock based on receiving a message (e.g., a message from user device 104) that includes data associated with unlocking the storage compartment of autonomous vehicle 106, such as a code for unlocking the storage compartment of autonomous vehicle 106, an identifier of the item (e.g., an identifier of the item that is stored in a data structure with an identifier of the designated storage compartment), and/or an identifier of the storage compartment (e.g., the designated storage compartment).

In some non-limiting embodiments, a user may unlock the storage compartment of autonomous vehicle 106 via the locking mechanism of the storage compartment. For example, the user may use a key, a combination dial, a keypad, and/or the like, on the locking mechanism of the storage compartment to unlock the storage compartment.

In some non-limiting embodiments, user device 104 may cause the storage compartment of autonomous vehicle 106 to unlock. For example, user device 104 may transmit a signal to autonomous vehicle management system 102, autonomous vehicle 106, and/or the locking mechanism of the storage compartment to cause the storage compartment of autonomous vehicle 106 to unlock. In some non-limiting embodiments, user device 104 may transmit the signal to autonomous vehicle 106 and/or the locking mechanism of the storage compartment via a short-range communication connection (e.g., a Bluetooth connection, an RFID connection, a near-field communication (NFC) connection, etc.).

Although embodiments have been described in detail for the purpose of illustration and description, it is to be understood that such detail is solely for that purpose and that embodiments are not limited to the disclosed embodiments, but, on the contrary, are intended to cover modifications and equivalent arrangements that are within the spirit and scope of the appended claims. For example, it is to be understood that the present disclosure contemplates that, to the extent possible, one or more features of any embodiment or aspect can be combined with one or more features of any other embodiment or aspect. In fact, any of these features can be combined in ways not specifically recited in the claims and/or disclosed in the specification. Although each dependent claim listed below may directly depend on only one claim, the disclosure of possible implementations includes each dependent claim in combination with every other claim in the claim set.

What is claimed is:

1. A system comprising:
at least one processor configured to:
receive data associated with an item to be positioned in a storage compartment of a plurality of storage compartments of a vehicle from a user device, wherein each of the plurality of storage compartments comprises a locking mechanism configured to lock and unlock the plurality of storage compartments;
determine that one or more storage compartments of the plurality of storage compartments has storage capacity for the item;
designate a storage compartment of the plurality of storage compartments for storage of the item as a designated storage compartment;
provide an indication of a position of the designated storage compartment of the vehicle to the user device, wherein, upon receipt by the user device, the indication causes a user interface to display the position of the designated storage compartment of the vehicle on the user device;
automatically activate the locking mechanism of the designated storage compartment to lock the designated storage compartment after the item is positioned in the designated storage compartment; and
automatically activate the locking mechanism of the designated storage compartment to unlock the designated storage compartment to allow removal of the item from the designated storage compartment.

2. The system of claim 1, wherein the at least one processor is further configured to:
receive an indication of a condition associated with the designated storage compartment of the vehicle from the user device.

3. The system of claim 1, wherein the at least one processor is further configured to:
determine whether the item has been removed from the designated storage compartment of the vehicle.

4. The system of claim 1, wherein, when designating the storage compartment of the plurality of storage compartments for storage of the item as the designated storage compartment, the at least one processor is configured to:
designate the storage compartment of the plurality of storage compartments for storage of the item as the designated storage compartment based on determining that the storage compartment has storage capacity for the item.

5. The system of claim 1, wherein the at least one processor is further configured to:
provide the indication of a position of the designated storage compartment of the vehicle to the user device.

6. The system of claim 1, wherein, when determining that the one or more storage compartments of the plurality of storage compartments has storage capacity for the item, the at least one processor is configured to:
compare the data associated with the item to data associated with the one or more storage compartments of the vehicle; and
determine that the data associated with the item corresponds to the data associated with the one or more storage compartments of the vehicle.

7. The system of claim 1, wherein the at least one processor is further configured to:
transmit a notification to the user device based on determining that the item has not been removed from the designated storage compartment of the vehicle.

8. A method comprising:
receiving, by at least one processor, data associated with an item to be positioned in a storage compartment of a plurality of storage compartments of an vehicle from a user device;
determining, by the at least one processor, that one or more storage compartments of the plurality of storage compartments has storage capacity for the item;
designating, by the at least one processor, a storage compartment of the plurality of storage compartments for storage of the item as a designated storage compartment;
providing, by the at least one processor, an indication of a position of the designated storage compartment of the vehicle to the user device, wherein, upon receipt by the user device, the indication causes a user interface to display the position of the designated storage compartment of the vehicle on the user device;
automatically activating, by the at least one processor, a locking mechanism of the designated storage compartment to lock the designated storage compartment after the item is positioned in the designated storage compartment; and
automatically activating, by the at least one processor, the locking mechanism of the designated storage compartment to unlock the designated storage compartment to allow removal of the item from the designated storage compartment.

9. The method of claim 8, further comprising:
receiving the indication of a condition associated with the designated storage compartment of the vehicle from the user device.

10. The method of claim 8, further comprising:
determining whether the item has been removed from the designated storage compartment of the vehicle.

11. The method of claim 8, wherein designating the storage compartment of the plurality of storage compartments for storage of the item as the designated storage compartment comprises:
designating the storage compartment of the plurality of storage compartments for storage of the item as the designated storage compartment based on determining that the storage compartment has storage capacity for the item.

12. The method of claim 8, further comprising:
providing the indication of a position of the designated storage compartment of the vehicle to the user device.

13. The method of claim 8, wherein determining that the one or more storage compartments of the plurality of storage compartments has storage capacity for the item comprises:
comparing the data associated with the item to data associated with the one or more storage compartments of the vehicle; and
determining that the data associated with the item corresponds to the data associated with the one or more storage compartments of the vehicle.

14. The method of claim 8, further comprising:
transmitting a notification to the user device based on determining that the item has not been removed from the designated storage compartment of the vehicle.

15. A non-transitory computer-readable medium storing one or more instructions that, when executed by at least one processor, cause the at least one processor to:
receive data associated with an item to be positioned in a storage compartment of a plurality of storage compartments of a vehicle from a user device, wherein each of the plurality of storage compartments comprises a locking mechanism configured to lock and unlock the plurality of storage compartments;
determine that one or more storage compartments of the plurality of storage compartments has storage capacity for the item;
designate a storage compartment of the plurality of storage compartments for storage of the item as a designated storage compartment;
provide an indication of a position of the designated storage compartment of the vehicle to the user device, wherein, upon receipt by the user device, the indication causes a user interface to display the position of the designated storage compartment of the vehicle on the user device;
automatically activate the locking mechanism of the designated storage compartment to lock the designated storage compartment after the item is positioned in the designated storage compartment; and
automatically activate the locking mechanism of the designated storage compartment to unlock the designated storage compartment to allow removal of the item from the designated storage compartment.

16. The non-transitory computer-readable medium of claim 15, wherein the one or more instructions further cause the at least one processor to:
receive an indication of a condition associated with the designated storage compartment of the vehicle from the user device.

17. The non-transitory computer-readable medium of claim 15, wherein the one or more instructions further cause the at least one processor to:
determine whether the item has been removed from the designated storage compartment of the vehicle.

18. The non-transitory computer-readable medium of claim 15, wherein, the one or more instructions that cause the at least one processor to designate the storage compartment of the plurality of storage compartments for storage of the item as the designated storage compartment, cause the at least one processor to:
designate the storage compartment of the plurality of storage compartments for storage of the item as the designated storage compartment based on determining that the storage compartment has storage capacity for the item.

19. The non-transitory computer-readable medium of claim 15, wherein the one or more instructions further cause the at least one processor to:
provide the indication of a position of the designated storage compartment of the vehicle to the user device.

20. The non-transitory computer-readable medium of claim 15, wherein, the one or more instructions that cause the at least one processor to determine that the one or more storage compartments of the plurality of storage compartments has storage capacity for the item, cause the at least one processor to:
compare the data associated with the item to data associated with the one or more storage compartments of the vehicle; and
determine that the data associated with the item corresponds to the data associated with the one or more storage compartments of the vehicle.

* * * * *